US011119735B1

(12) United States Patent
Baafi et al.

(10) Patent No.: US 11,119,735 B1
(45) Date of Patent: Sep. 14, 2021

(54) UNIVERSAL HYBRID PROGRAMMING ENVIRONMENT

(71) Applicant: MODKIT INC., Cambridge, MA (US)

(72) Inventors: Edward K. Baafi, Quincy, MA (US); Collin C. Reisdorf, Exeter, NH (US)

(73) Assignee: MODKIT INC., Cambridge, MA (US)

( * ) Notice: Subject to any disclaimer, the term of this patent is extended or adjusted under 35 U.S.C. 154(b) by 0 days.

(21) Appl. No.: 16/121,548

(22) Filed: Sep. 4, 2018

Related U.S. Application Data

(60) Provisional application No. 62/553,317, filed on Sep. 1, 2017.

(51) Int. Cl.
*G06F 8/34* (2018.01)
*G06F 3/0486* (2013.01)
*G06F 8/33* (2018.01)

(52) U.S. Cl.
CPC .............. *G06F 8/34* (2013.01); *G06F 3/0486* (2013.01); *G06F 8/33* (2013.01)

(58) Field of Classification Search
CPC ..... G06F 8/33; G06F 8/34; G06F 8/51; G06F 3/04817
See application file for complete search history.

(56) References Cited

U.S. PATENT DOCUMENTS

| | | | | |
|---|---|---|---|---|
| 5,760,788 A * | 6/1998 | Chainini | ............ | G09B 19/0053 345/474 |
| 7,530,052 B2 * | 5/2009 | Morrow | .................... | G06F 8/34 715/763 |
| 9,595,202 B2 * | 3/2017 | Chong | .................... | G09B 5/062 |
| 9,886,268 B1 * | 2/2018 | Eddins | ........................ | G06F 9/54 |
| 10,324,712 B1 * | 6/2019 | Nolan | ........................ | G06F 8/41 |
| 10,929,109 B2 * | 2/2021 | Yin | ............................ | G06F 8/34 |
| 2017/0052767 A1 * | 2/2017 | Bennett | .................... | G06F 8/34 |
| 2017/0060541 A1 * | 3/2017 | Saleh | .................. | G06F 3/04842 |

(Continued)

OTHER PUBLICATIONS

Millner, "Modkit: Blending and Extending Approachable Platforms for Creating Computer Programs and Interactive Objects",Jun. 2011, pp. 1-4 (Year: 2011).*

(Continued)

*Primary Examiner* — Duy Khuong T Nguyen
(74) *Attorney, Agent, or Firm* — Morse, Barnes-Brown & Pendleton, P.C.; Sean D. Detweiler, Esq.

(57) ABSTRACT

A method and system for providing a hybrid block and text-based programming environment. The hybrid block and text-based programming environment provides a software development tool suitable for users of different programming skill levels to write and understand code. The hybrid programming environment enables a user to view and edit source code through multiple graphical representative displays of the source code in a manner not previously achievable. Each of the graphical representative displays is linked to a particular programming view that has a unique set of rules related to the functionality of the displayed graphical elements to enable the more comprehensive functionality. The graphical representative displays provide a tool to educate novice programmers as they become more proficient and assist in the transition between block-based and textual representations.

23 Claims, 45 Drawing Sheets

(56) References Cited

U.S. PATENT DOCUMENTS

2018/0285084 A1* 10/2018 Mimlitch, III .......... G06F 8/447

OTHER PUBLICATIONS https:web.archive.org/web/20170824154834/https://www.touchdevelop.com/, accessed on Aug. 24, 2017.
https://web.archive.org/web/20170822034836/https://developers.google.com/blockly/, accessed on Aug. 22, 017.
https://web.archive.org/web/20170830005327/https://www.ni.com/en-us/shop/labview.html, accessed on Aug. 30, 2017.
https://web.archive.org/web/20170628043141/https://pencilcode.net/print/first, accessed on Jun. 28, 2017.
https://web.archive.org/web/20170304155250/http://code.org/educate/applab, accessed on Mar. 4, 2017.
https://www.media.mit.edu/projects/logo-blocks/overview/, accessed on Jan. 8, 2019.
https://web.archive.org/web/20170813112940/http://web.mit.edu/mitstep/starlogo-tng/download/index.html/, accessed on Aug. 13, 2017.
https://web.archive.org/web/20170830052036/https://scratch.mit.edu/, accessed on Aug. 30, 2017.
https://web.archive.org/web/20170824081320/https://html-css-js.com/, accessed on Aug. 24, 2017.

* cited by examiner

```
    /**
     * clears the whole RobotLCD screen
     * @category Action
     */
    void clearScreen(void);

/**
     * clears the rest of the line on the RobotLCD screen
     * @category Action
     */
    void clearLine(void);

/**
     * clears the rest of the line and then moves cursor to beginning of next
line on the RobotLCD screen
     * @category Action
     */
    void newLine(void);

/**
     * gets the column of the RobotLCD screen
     * @category Sensing
     */
    number column(void);

/**
     * gets the row of the RobotLCD screen
     * @category Sensing
     */
    number row(void);
};
/* End File RobotLCD.h */

/* Begin File RobotMotor.h */ class RobotMotor{
  public:
    /**
     * the RobotMotor is the muscle behind your robot
     * @category Constructor
     */
    RobotMotor(RobotPortName port);

/**
     * spins the RobotMotor in a given direction
     * @category Action
     */
    void spin(rotaryDirection dir);

```
    * spins the RobotMotor to a given position, using given units
    * @category Action
    */
   void spinTo(number position,AngleUnits units);

/**
    * spins the RobotMotor for a given delta, using given units
    * @category Action
    */
   void spinFor(number delta,AngleUnits units);

/**
    * _stops_ the *RobotMotor*
    * @category Action
    */
   void stop();

private:
    RobotPortName port;
};

/* End File RobotRobotMotor.h */

/* Begin File RobotBrain.h */
#include "RobotLCD.h"

class RobotBrain{
 public:
    RobotBrain(void){
    }
    RobotLCD LCD;
};

/* End File RobotBrain.h */
```

*Fig. 4E*

```
1  when( START ){
     /* Note:
        Set all the motors
        power here.
     */
     motorPower = 80;
     if( motorPower < 100 ){
       motorPower = 100;
     }
   }
```

```
2  when( BUMPER.PRESSED ){
     //Set motor to half power.
     setVelocity( 75, PCT );
     setMaxPower( motorPower / 2, PCT );
     spin( FWD, 90, DEG );
   }
```

Fig. 9F

```
1  when( MOTOR ){
2  // Group: 1
3  when( START ){
4    /* Note:
5       Set all the motors'
6       power here.
7    */
8    motorPower = 80;
9    if( motorPower > 100 ){
10     motorPower = 100;
11   }
12 }
13 // Group: 2
14 when( BUMPER_PRESSED ){
15   //Set motor to half power.
16   setVelocity( 75, PCT );
17   setMaxPower( motorPower / 2, PCT );
18   // This motor is half power.
19   spin( FWD, 90, DEG );
20 }
21 }
```

*Fig. 9G*

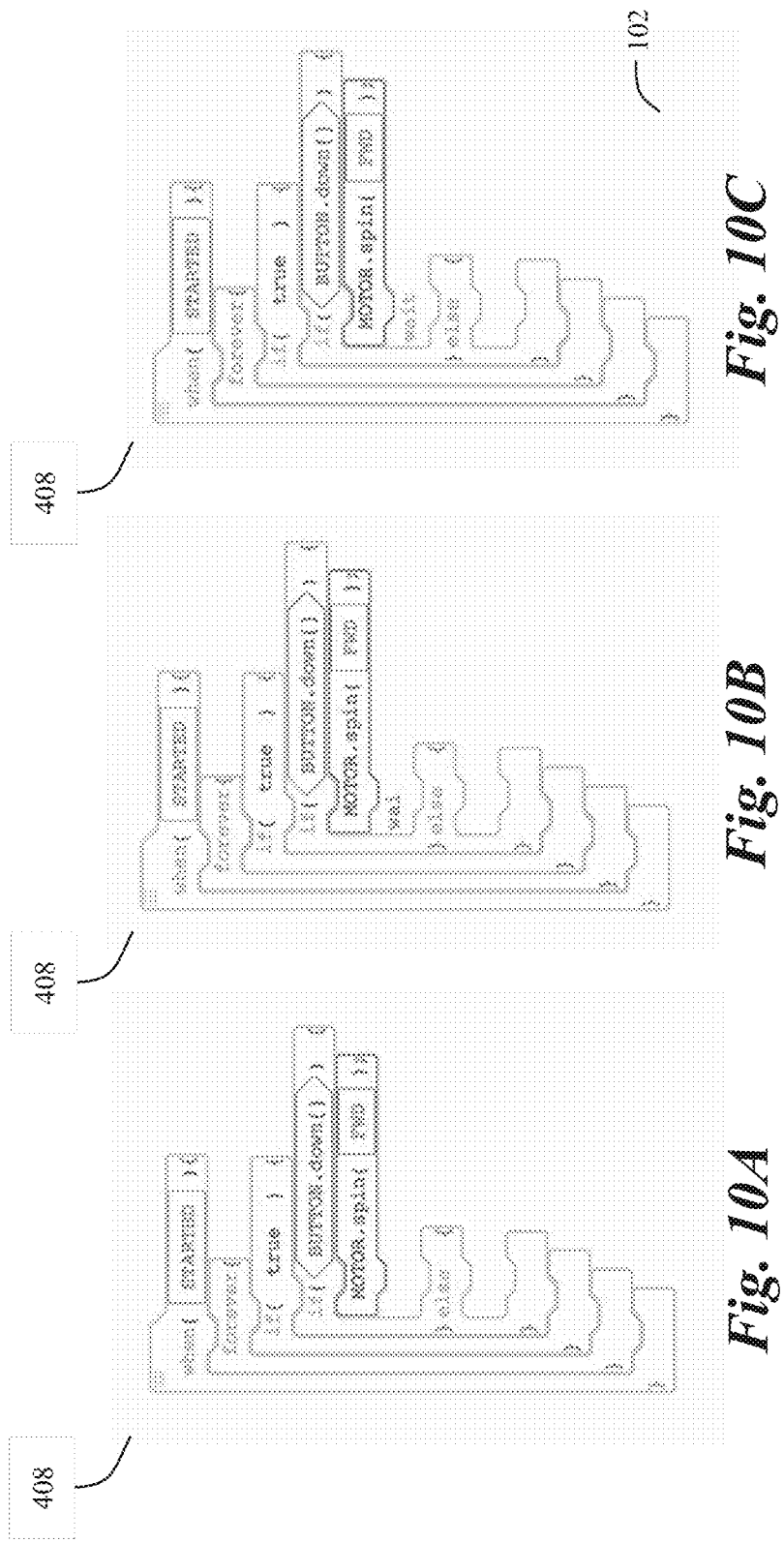

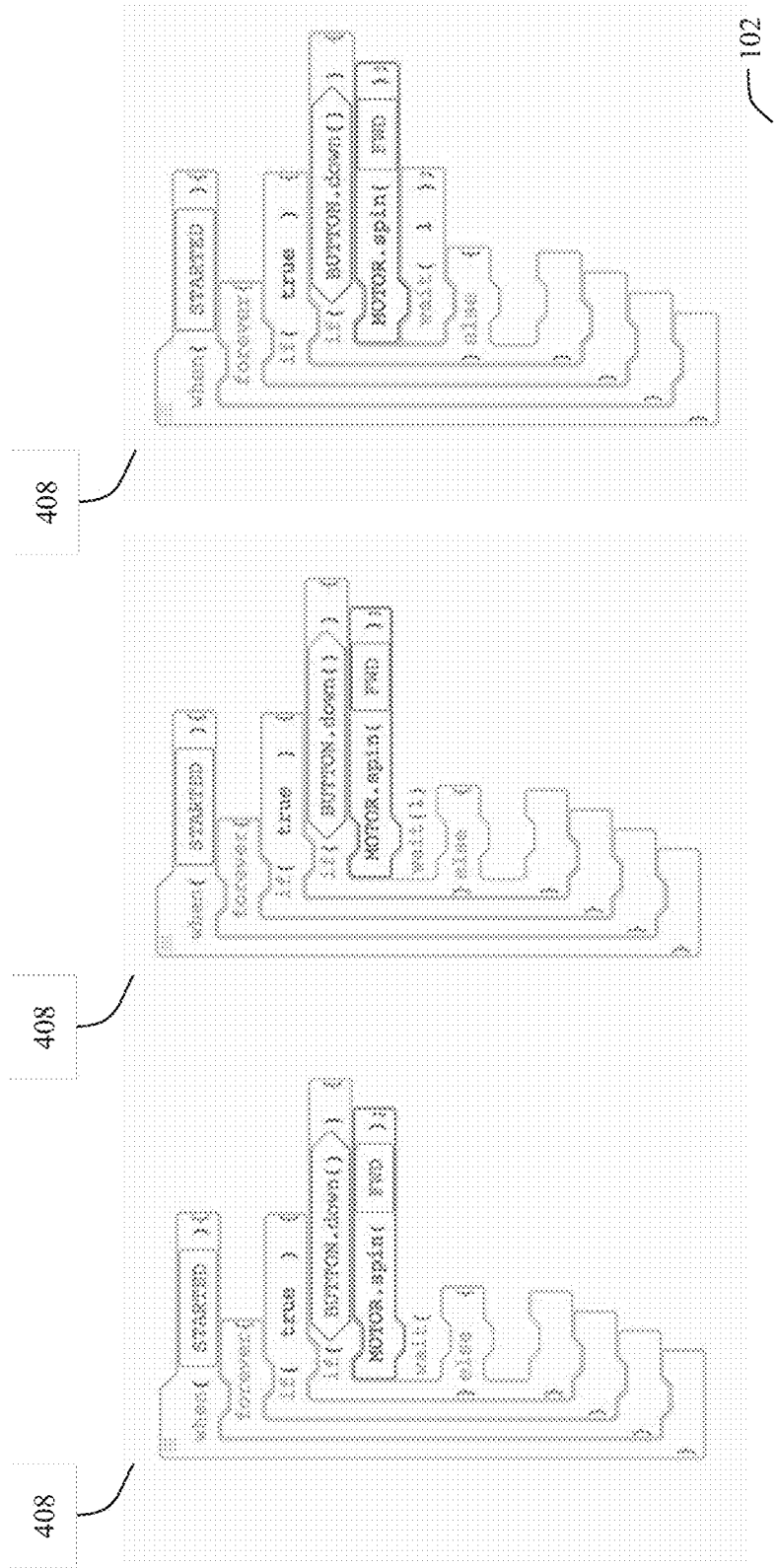

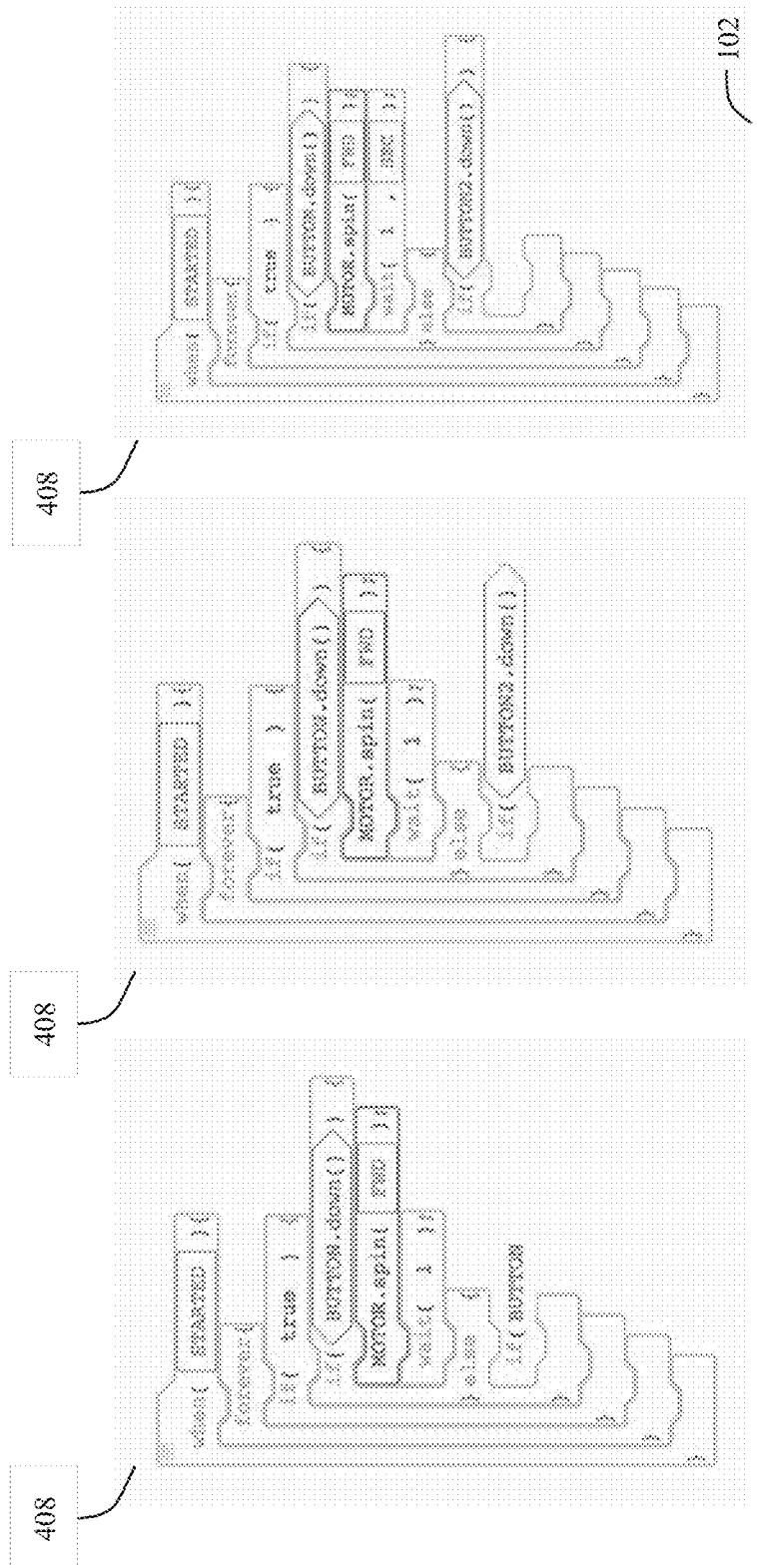

| Step | Raw Code | Frame | Syntax Markup + Semantic Attributes |
|---|---|---|---|
| 602 | | | `<code></code>` |
| 604 | w | w | `<code>...<identifier>identif ier</identifier>...</code>` |
| 606 | when | when | `<code>...keyword... category="control">when</keyword>...</code>` |
| 608 | when ( | when ( | `<code>...keyword... ...identifier></identifier>...</code>` |
| 610 | when (STARTED | when (░░░ | `<code>...keyword... ...open-paren>...identifier type="event">STARTED</identifier>...</code>` |
| 612 | when (STARTED) | when (░░░) | `<code>...keyword... ...open-paren>...identifier type="event">STARTED</identifier> ...close-paren>...statement><compound-statement><block><open-brace>...</code>` |
| 614 | when (STARTED) {<br>} | when (░░░) {░} | `<code><statement><control-structure><scope><keyword category="control">when</keyword><p arameters><open-paren></open-paren><parameter><identifier type="event">STARTED</identifier><close-paren></close-paren></parameters><statement><compound-statement><block><open-brace>{</open-brace><newline></newline><newline></newline><close-brace>}</close-brace></block></compound-statement></statement></scope></control-structure></statement></code>` |

```
when(STARTED){
    Motor1.spin(forward);
} when(STARTED){
    Motor1.spin(forward);
} when(STARTED){
    Motor1.spin(forward);
} when(STARTED){
    Motor1.spin(forward);
} when(STARTED){
    Motor1.spin(forward);
} when(STARTED){
    Motor1.spin(forward);
} when(STARTED){
    Motor1.spin(forward);
}
```

```
when(STARTED){
    Motor1.spin(forward);
} when(STARTED){
    Motor1.spin(forward);
} when(STARTED){
    Motor1.spin(forward);
} when(STARTED){
    Motor1.spin(forward);
} when(STARTED){
    Motor1.spin(forward);
} when(STARTED){
    Motor1.spin(forward);
} when(STARTED){
    Motor1.spin(forward);
}
```

*Fig. 12*

```
//Control Structures
controlstructure:
    scope_ifStatement
    scope_foreverStatement
    scope_repeatStatement
    scope_whileStatement
    scope_forStatement
```

```
* label:control_structure
* label:control_structure
* label:control_structure
* label:control_structure
* label:control_structure
```

| Traditional Text | |
|---|---|
| 308 | ```
with( MOTOR ){
// Group: 1
  when( START ){
    /* Note:
        Set all the motors'
        power here.
    */
    motorPower = 80;
    if( motorPower > 100 ){
      motorPower = 100;
    }
  }

// Group: 2
  when( BUMPER.PRESSED ){
    //Set motor to half power.
    setVelocity( 75, PCT );
    setMaxPower( motorPower / 2, PCT );
    // This motor is half power.
    spin( FWD, 90, DEG );
  }
}
``` |

*Fig. 14C*

| | |
|---|---|
| Raw Text | spin(FWD,90,DEG); |
| Programming Language Block |  — 302 |
| Natural Language Block |  — 303 |
| Markup (with English natural language translation) | <statement data-name="spin" data-shape="block-s" data-category="action" data-return-type="void" class="ui-draggable ui-draggable-handle"><expression><function-call><identifier>spin</identifier><parameters><open-paren>(</open-paren><parameter><expression data-name="FWD" data-shape="custom-literal" data-category="custom" data-type="rotary_direction"><identifier data-natural-language-english="FORWARD">FWD</identifier></expression><comma data-natural-language-english=" for ">,</comma><parameter><expression><number-literal contenteditable="true" class="ui-draggable">90</number-literal></expression><comma>,</comma><parameter><expression data-name="degrees" data-shape="custom-literal" data-category="custom-override" data-type="rotary_direction" data-dropdown-id="degrees-revolutions_dropdown"><identifier data-natural-language-english="°">DEG</identifier></expression><close-paren>)</close-paren></parameters></function-call></expression><semicolon>;</semicolon></statement> |
| CSS (for natural language translation) | [data-display="block"] comma,<br>[data-display="block"] open-paren,<br>[data-display="block"] close-paren,<br>[data-display="block"] semicolon<br>{<br>  visibility:hidden;<br>}<br>[data-language="english"] [data-natural-language-english] {<br>  font-size: 1px;<br>  letter-spacing: -1px;<br>  color: transparent;<br>  visibility:visible;<br>}<br><br>[data-language="english"] [data-natural-language-english]::before {<br>  font-size: initial;<br>  letter-spacing: initial;<br>  color: initial;<br>  content: attr(data-natural-language-english);<br>} |
| lookup table (JSON) | {"language":"english",<br>"replace":{"identifiers":{"FWD":"FORWARD","DEG":"°"},"functions":{"spin":{"commas":{"for":null}}}}} |

*Fig. 15*

UNIVERSAL HYBRID PROGRAMMING ENVIRONMENT

CROSS-REFERENCE TO RELATED APPLICATION(S)

This application claims priority to, and the benefit of U.S. Provisional Application 62/553,317, filed Sep. 1, 2017, for all subject matter common to both applications. The disclosure of said provisional application is hereby incorporated by reference in its entirety.

FIELD OF THE INVENTION

The present invention relates to a software development tool suitable for users of different programming skill levels to write and understand code. In particular, the present invention relates to a programming environment featuring dragging and dropping of source code in a manner that directs dragging and constrains dropping toward valid syntactic and semantic results and featuring syntactic and semantic framing of source code providing feedback familiar to users of block programming environments as the user types. The programming environment enables a user to view and edit source code in a mode not previously achievable.

BACKGROUND

Generally, in the early days of computing, computer programs were entered through punch tape and toggle switches. As computer keyboards and monitors capable of displaying text characters became more widespread, computer programs could then be entered by typing familiar natural language characters on a keyboard and viewed as they were typed in real-time on a computer monitor. This allowed for higher level computer languages that were closer to the human languages of their authors. At present, text inputted through a computer keyboard and displayed on a computer monitor in text form is still the dominant paradigm in entering and viewing computer programs.

In addition to text editors, a programming methodology called visual programming has also emerged in recent years and is widely used in educational domains. Visual programming languages allow users to create computer programs by manipulating graphical program elements (e.g., drag and drop) rather than typing source code as text. Early visual programming languages and environments could be mostly categorized as dataflow languages where a program is represented as a directed graph, with operations represented as shapes connected by lines and arrows. When LogoBlocks was introduced by researchers at the Massachusetts Institute of Technology (MIT) it was unlike previous visual programming tools. Its users would drag images of blocks or puzzle pieces (block shapes suggested how they should be connected) and the system would then generate text-based Logo code.

LogoBlocks can be considered the first of what would become known as "block" programming languages, which draw block (puzzle) shapes around and behind text and icons representing program code, providing visual cues and feedback designed to help construct valid programs. Compared to dataflow systems, block programming more closely mirrored traditional text programming, as most block programming systems represent statements and expressions as text (e.g. identifiers and keywords) on top of a block or puzzle piece, with blocks being read left to right and top down. So, other than a colorful background, block programming is still mostly just text. Two later environments StarLogo TNG, and Scratch (both from MIT) further refined and popularized the block programming metaphor for millions of young and/or novice programmers.

Generally, text code editor components exist that allow developers to add text source code editing and associated functionality (auto-indent, auto-completion, syntax and semantic code-coloring/highlighting, etc.) to their applications, including applications built with web technologies such as HTML/CSS/JavaScript. Block editor components also exist, that allow developers to add block code editing and associated functionality (drag and drop block code snippets, category and type-based color and shape, etc.) to their applications, also including applications built with web technologies.

Recently, a number of programming environments have emerged, to facilitate the transition between blocks and text, featuring both graphical block and traditional text display and editing of source code. The most advanced of these environments feature automatic conversion back and forth between block and text displays. However, these systems generally utilize block and text editing components that are not well coordinated, leading to duplicate implementations of related functionality like text and block coloring, choosing/loading fonts and changing text/block size, etc. While many considerations like these can be coordinated between block and text editor components to facilitate a smoother transition between block and text views or modes, the current state of the art leaves much to be desired.

SUMMARY

There is a need for programming environments that better support novice programmers as they become more proficient and transition between block and text code representations, while still remaining accessible to beginners, and programming environments that better coordinate presentation and editing functions between block and text modes.

The present invention is directed toward further solutions to address this need, in addition to having other desirable characteristics. Specifically, the present invention relates to an integrated hybrid editor providing both block and text code editing, offering a specific improvement over the separate block and text components of prior hybrid block and text-based environments by enabling users to edit and interact with text-code in a manner that was previously only possible with block-based code. The present invention enables users to drag and drop text-code snippets in a manner that guides users during dragging, to create valid code (either syntactically valid, semantically valid or both) and prevents users from insertion of errant code (either syntactically errant, semantically errant, or both) during dropping, in a manner that is familiar to users of block-based programming environments, thus making text programming more accessible to users of block-based programming environments and to novices previously limited to learning with such block-based environments.

Moreover, the present invention allows users to move back and forth between a syntactically and semantically directed and constrained drag-and-drop enabled block-view and a syntactically and semantically directed and constrained drag-and-drop enabled text-view, further facilitating the transition from block to text programming by presenting the same consistent drag and drop input mechanism for both views within the same environment. In addition to providing familiar block interactions (directed and constrained drag and drop) to traditionally displayed text code, the present invention also provides a frame view featuring positive and negative feedback using familiar block shapes when valid or invalid syntax or semantics is entered by the user in a view that also features traditional text interaction (typing free form text).

In accordance with example embodiments of the present invention, a hybrid programming environment creates and stores language metadata (including semantic and syntactic metadata) in addition to the source code to facilitate guiding the user in dropping code snippets and in blocking code snippets from being dropped incorrectly across each view. The same language metadata is used in block, text, and frame views to determine how to display code in a text view (syntax and semantic code coloring) and how to display blocks in a block view (syntax and semantic shapes and coloring), allowing previously unachievable coordination between programming views. Additionally the same metadata is used to provide real-time positive visual feedback for users typing in frame view in a way that is consistent with the visual cues in block view. This not only benefits users of the system in having consistent styles and behaviors in the different views, but also benefits the maintainers of the hybrid programming environment by sharing core styling and functionality between different modes/views without having to duplicate closely related functionality in separately implemented code editors (block, text, and the new frame view). Previous block programming environments have either featured blocks that use the natural language of their users (to make adoption easier) or blocks that use language modeled after the underlying programming languages to which they convert (to make moving to traditional programming languages easier and more direct). The present invention also allows for conversion between a natural language blocks view and a programming language blocks view to simultaneously simplify initial user adoption and to simplify moving between blocks and traditional programming languages. Since each view is driven by the same source code and metadata, this make conversion between views simpler and more efficient than previously possible in addition to providing conversions and views never before possible.

In accordance with example embodiments of the present invention, a method implements a programming environment for creating, editing, and viewing source code. The method presents to a user, using a processor of a computing device and a graphical user interface, a code-editor workspace comprising a display configured for selecting source code snippets and authoring, editing, and viewing source code. The method receives from the user a selected source code snippet and generates, based on a selected source code snippet, user interface elements comprising a textual representation of the selected source code snippet with visual cues and feedback indicating the graphical user interface allows placement by dragging and dropping of user interface elements. The method provides, based on input from the user, the textual representation of the selected source code snippet as draggable, providing feedback indicating where the textual representation will go, and parses the source code already present and the textual representation, with a parser, and identifying drop zones, where drop zones match syntactic elements including the group consisting of parameters, conditions, whitespace and combinations thereof. The method restricts, by the code editor workspace and the graphical user interface, the textual representation of the selected source code snippet from being inserted where the selected source code snippet is incompatible with one or more of the group consisting of syntax, semantics and combinations thereof of source code already present, and allowing the selected source code snippet only to be dropped where metadata indicates the selected source code snippet will fit into the source code already present, wherein positive feedback is presented indicating that upon dropping the selected source code snippet is proper and inserted in a correct position as indicated by the metadata; and then integrates the textual representation with text of source code already present, wherein all text code, comprising both the source code already present and the textual representation of the selected source code snippet, is editable using received keystrokes received from the user by an input-output interface communicating with the processor of the computing device and deleting portions of the source code in response to input from the user by an input-output interface communicating with the processor of the computing device, thereby generating a hybrid view in the code-editor workspace using the graphical user interface that combines a traditional text view comprising a human-readable text display of the source code edited by keystrokes typed by the user with selected source code snippet placement by dragging and dropping of user interface elements, that is restricted by one or more of the group consisting of syntax, semantics and combinations thereof, in a single view.

In accordance with aspects of the present invention, the method can further comprise generating feedback indicating the graphical user interface allows placement by dragging and dropping of the selected source code snippet comprising one or more of the group consisting of feedback based on metadata for cursor proximity, additional user interface elements, and drag handles indicating where and from what portions or areas of the selected code snippet is allowed to be dragged from for placement within the graphical user interface and the code-editor workspace.

In accordance with aspects of the present invention, the feedback can indicate where the textual representation will go and can further comprise pushing other text of source code already present out of position corresponding to a drop zone in the graphical user interface.

In accordance with aspects of the present invention, the method can further comprise parsing, using a parser, the source code already present and the textual representation of the selected source code snippet and identifying from parsing new snippets, wherein new snippets match syntactic elements comprising one or more of the group consisting of statements, expressions, and combinations thereof. New snippets may be selected for dragging and dropping to move or remove said new snippets with respect to the graphical user interface and the code-editor workspace.

In accordance with example embodiments of the present invention, a method provides a programming environment for creating, editing, and viewing source code. The method presents to a user, using a processor of a computing device and a graphical user interface, a code-editor workspace comprising a display configured for authoring, editing, and viewing source code, and receives, keystrokes from the user by an input-output interface communicating with the processor of the computing device, and based on one or more received keystrokes, creates source code within the editor workspace or editing text of source code already present. The method parses, using a parser, source code within the editor workspace and identifies one or more of the group consisting of syntactic elements, semantic attributes, and combinations thereof, and generating visual cues and feedback, indicating identification one or more of the group consisting of particular identified syntactic elements, particular identified semantic attributes, and combinations thereof, comprising framing of one or more of the group consisting of the particular identified syntactic elements, the particular identified semantic attributes, and combinations thereof, using one or more of the group consisting of lines, outlines, partially enclosed shapes, fully enclosed shapes, an enclosed perimeter around the particular identified syntactic elements, and combinations thereof. The method then integrates text code, comprising both the source code already present and the edits based on the one or more received keystrokes, thereby enabling all text code to be editable and capable of deletion in response to input from the user by an input-output interface communicating with the processor of the computing device, thereby generating a hybrid view in the code-editor workspace using the graphical user interface that combines a traditional text view, comprising a human-readable text display of the source code edited by one or more received keystrokes typed by the user, with visual cues and feedback comprising framing of one or more of the group consisting of the particular identified syntactic elements, the particular identified semantic attributes, and combination thereof using one or more of the group consisting of lines, outlines, partially enclosed shapes, fully enclosed shapes, an enclosed perimeter around the particular identified syntactic elements, and combinations thereof, in a single view.

In accordance with aspects of the present invention, syntactic elements can comprise one or more of the group consisting of statements, expressions, identifiers, keywords, compound statements, control structures, literal values, function calls, and combinations thereof. Additionally, semantic attributes can comprise one or more of the group consisting of expected data-types of parameters, return types of function calls, types of literal values, types of identifiers, types of variables, and combinations thereof.

In accordance with aspects of the present invention, the method can further comprise generating feedback indicating the graphical user interface allows placement by dragging and dropping of a selected source code snippet comprising one or more of the group consisting of feedback based on metadata for cursor proximity, additional user interface elements, and drag handles indicating where the selected code snippet is allowed to be dragged from.

In accordance with example embodiments of the present invention, a system provides for creating, editing, and viewing source code using a processor and memory. The system comprises an input-output interface configured for receiving, from a user, an input of source code into a code-editor workspace and selection of code snippets within a code-editor workspace, and a parser configured for parsing text content of the input of source code and identifying syntactic elements within the text content. The system also comprises a code-editor workspace presenting a graphical user interface to a user, using the processor, comprising a display on a computing device configured for authoring, editing and selecting source code. The code-editor workspace comprises a frame view, in turn comprising visually distinguishable user interface elements, wherein, upon identification of syntactic elements within the text content, the frame view presents to the user, in the graphical user interface, feedback comprising framing of identified syntactic elements using one or more of the group consisting of lines, outlines, partially enclosed shapes, fully enclosed shapes, an enclosed perimeter around the identified syntactic elements, and combinations thereof.

In accordance with aspects of the present invention, the identified syntactic elements can comprise one or more of the group consisting of statements, expressions, identifiers, keywords, compound statements, control structures, literal values, function calls, and combination thereof. The identified syntactic elements can comprise one or more of the group consisting of statements, expressions, identifiers, keywords, compound statements, control structures, literal values, function calls, and combination thereof, and the identified semantic elements can comprise an expression, and the code editor workspace, using the graphical user interface, identifies a data-type associated with the expression and presents the user with additional feedback denoting the data-type of the expression.

In accordance with aspects of the present invention, the additional feedback can comprise one or more of the group consisting of a data-type specific shape, an icon, and combinations thereof, and the user interface elements comprise visual cues and feedback indicating the graphical user interface allows placement by dragging and dropping of the user interface elements and providing, based on input from the user, the user interface elements as draggable and providing feedback indicating where the textual representation will go but restricting, by the code editor workspace and the graphical user interface, the user interface elements from being dropped where the user interface elements are incompatible with one or more of the group consisting of syntax, semantics and combinations thereof of source code already present, and allowing the user interface elements only to be dropped where metadata indicates the user interface elements will fit into the source code already present, wherein positive feedback is presented indicating that upon dropping the user interface elements are proper and inserted in a correct position as indicated by the metadata. The user interface elements are integrated with text of source code already present, thereby generating a hybrid view in the code-editor workspace using the graphical user interface that combines the frame view comprising a human-readable text display of the source code edited by keystrokes typed by the user with user interface elements placement by dragging and dropping of user interface elements, that is restricted by one or more of the group consisting of syntax, semantics and combinations thereof, in a single view.

In accordance with example embodiments of the present invention, a system provides for creating, editing, and viewing source code using a processor and memory. The system provides an input-output interface configured for receiving, from a user, an input of source code into a code-editor workspace and a parser configured for parsing text content of the input of source code and identifying syntactic elements within the text content. The system also provides a code-editor workspace presenting a graphical user interface to the user, using the processor, comprising a display on a computing device configured for authoring and editing source code, wherein the code-editor workspace comprises one or more presentation views. The presentation views include a frame view, comprising visually distinguishable user interface elements, wherein, upon identification of syntactic elements within the text content, the frame view presents to the user, in the graphical user interface, feedback comprising framing of identified syntactic elements using one or more of the group consisting of lines, outlines, partially enclosed shapes, fully enclosed shapes, an enclosed perimeter around the identified syntactic elements, and combinations thereof.

In accordance with aspects of the present invention, the identified syntactic elements can comprise one or more of the group consisting of statements, expressions, keywords, compound statements, control structures, literal values, function calls, and combination thereof. The identified semantic elements can comprise an expression, and the code editor workspace, using the graphical user interface, identifies a data-type associated with the expression and presents the user with additional feedback denoting the data-type of the expression. The additional feedback comprises one or more of the group consisting of a data-type specific shape, an icon, and combinations thereof. Additionally, the user interface elements can comprise visual cues and feedback indicating the graphical user interface allows placement by dragging and dropping of the user interface elements and providing, based on input from the user, the user interface elements as draggable and providing feedback indicating where the textual representation will go but restricting, by the code editor workspace and the graphical user interface, the user interface elements from being dropped where the user interface elements are incompatible with one or more of the group consisting of syntax, semantics and combinations thereof of source code already present, and allowing the user interface elements only to be dropped where metadata indicates the user interface elements will fit into the source code already present, wherein positive feedback is presented indicating that upon dropping the user interface elements are proper and inserted in a correct position as indicated by the metadata. The user interface elements can be integrated with text of source code already present, thereby generating a hybrid view in the code-editor workspace using the graphical user interface that combines the frame view comprising a human-readable text display of the source code edited by keystrokes typed by the user with placement by dragging and dropping of user interface elements, that is restricted by one or more of the group consisting of syntax, semantics and combinations thereof, in a single view.

In accordance with example embodiments of the present invention, a method provides for conversion of source code between a computer language and a natural language. The method acquires, using a processor of a computing device, source code selected for conversion, and parses, using the processor, source code written in the computer language, with a parser, and identifying syntactic elements to be localized comprising the group consisting of identifiers, parameters, conditions, function calls, commas, spaces, parenthesis and combinations thereof. The method further receives, from a user a desired localization in the natural language for the syntactic elements to be localized wherein each syntactic element of the syntactic elements comprises one or more of the group consisting of identifiers, parameters, conditions, function calls, commas, spaces, parenthesis and combinations thereof, and is capable of being substituted for a localized string.

In accordance with aspects of the present invention, the localized string can comprise an empty string. Further, the method can comprise storing localized syntactic elements in a data structure for retrieval. Additional source code written in the computer language is parsed with a parser and identifying syntactic elements to be localized comprising one or more of the group consisting of identifiers, parameters, conditions, function calls, commas, spaces, parenthesis and combinations thereof. The localized syntactic elements are retrieved. The localized syntactic elements are applied to the additional source code. A localized version of the source code including the additional source code is presented to a user. The method can further present, using the processor and a graphical user interface, the localized version of the source code to a user using graphical blocks or frames.

In accordance with example embodiments of the present invention, a system provides for creating, editing, and viewing source code, comprising using a processor and a memory. The system comprises an input-output interface configured for receiving, from a user, an input of source code into a code-editor workspace, and a parser configured for parsing text content of the input of source code and identifying syntactic elements within the text content. The system provides a code-editor workspace presenting a graphical user interface to the user, using the processor, comprising a display on a computing device configured for authoring and editing source code. The code-editor workspace comprises a plurality of presentation views for presenting the source code in the display using a plurality of user interface elements based on metadata and a universal language code markup of the source code, wherein each presentation view of the plurality of presentation mode views provides different graphical displays of the source code based on a universal language code markup of the source code and a unique set of rules controlling functionality of displayed user interface elements. The plurality of presentation mode views comprising two or more of: a natural language block view wherein program code is presented to the user in a natural language; a programming language block view comprising program code presented to the user in a traditional programming language and where language elements including the group consisting of identifiers, commas, parentheses, semicolons, periods, and combinations thereof may be hidden or replaced; a frame view, comprising visually distinguishable user interface elements, wherein, upon identification of syntactic elements within the text content, the frame view presents to the user, in the graphical user interface, feedback comprising framing of identified syntactic elements using one or more of the group consisting of lines, outlines, partially enclosed shapes, fully enclosed shapes, an enclosed perimeter around the identified syntactic elements, and combinations thereof a note view comprising individual snippets of code wherein each note snippet can be dragged to any position on a graphical display and may overlap other notes or snippets; and a traditional text view, in which text only source code comprising a human-readable programming language is edited by typing. The system also can provide hybrid combinations thereof comprising a hybrid mode view as selected by the user that incorporates different elements of the different views based on user preferences.

In accordance with aspects of the present invention, the system can further comprise a graphical user interface comprising a slider or dial for switching views and providing animations between views highlighting differences between views. The slider or dial provides additional hybrid states between views by only applying some of the differences.

BRIEF DESCRIPTION OF THE FIGURES

These and other characteristics of the present invention will be more fully understood by reference to the following detailed description in conjunction with the attached drawings, in which:

FIGS. 4B, 4C, 4D, and 4E depict various components and states of the automatic detection and display of a block (and/or text) API;

FIGS. 7A, 7B, 7C, and 7D depict snippets of draggable text code that only drop where they make syntactic and semantic sense;

FIGS. 9A, 9B, 9C, 9D, 9E, 9F, 9G and 9H are illustrative examples of representative views of code generated by a graphical user interface in accordance with different presentation mode views of the present invention;

FIGS. 10A, 10B, 10C, 10D, 10E, 10F, 10G, 10H, and 10I are illustrative examples of representative views of source code generated in frame mode and displayed in an interface in accordance with the present invention;

FIGS. 11A, 11B, 11C, 11D, 11E, 11F, and 11G are illustrative examples of framing of source code generated in frame mode and corresponding markup in accordance with the present invention;

FIG. 12 depicts illustrative examples of the wide variety of ways source code may be framed in a frame view including solid lines, dotted lines, outlines, partially enclosed shapes, fully enclosed shapes. Additionally any colors may be used;

FIG. 13 depicts an example grammar snippet with labels to map grammar rules and elements to tags allowing the present invention to support multiple programming languages easily;

FIGS. 14A, 14B and 14C depict illustrative examples of a plurality of code-editor workspace views and their typical features;

FIG. 15 depicts an illustrative example of a given block displayed as a natural language block and displayed as a programming language block, demonstrating how universal language markup and CSS styles allow for both displays, and an example lookup table used to localize the programming language block;

DETAILED DESCRIPTION

Figure 1:
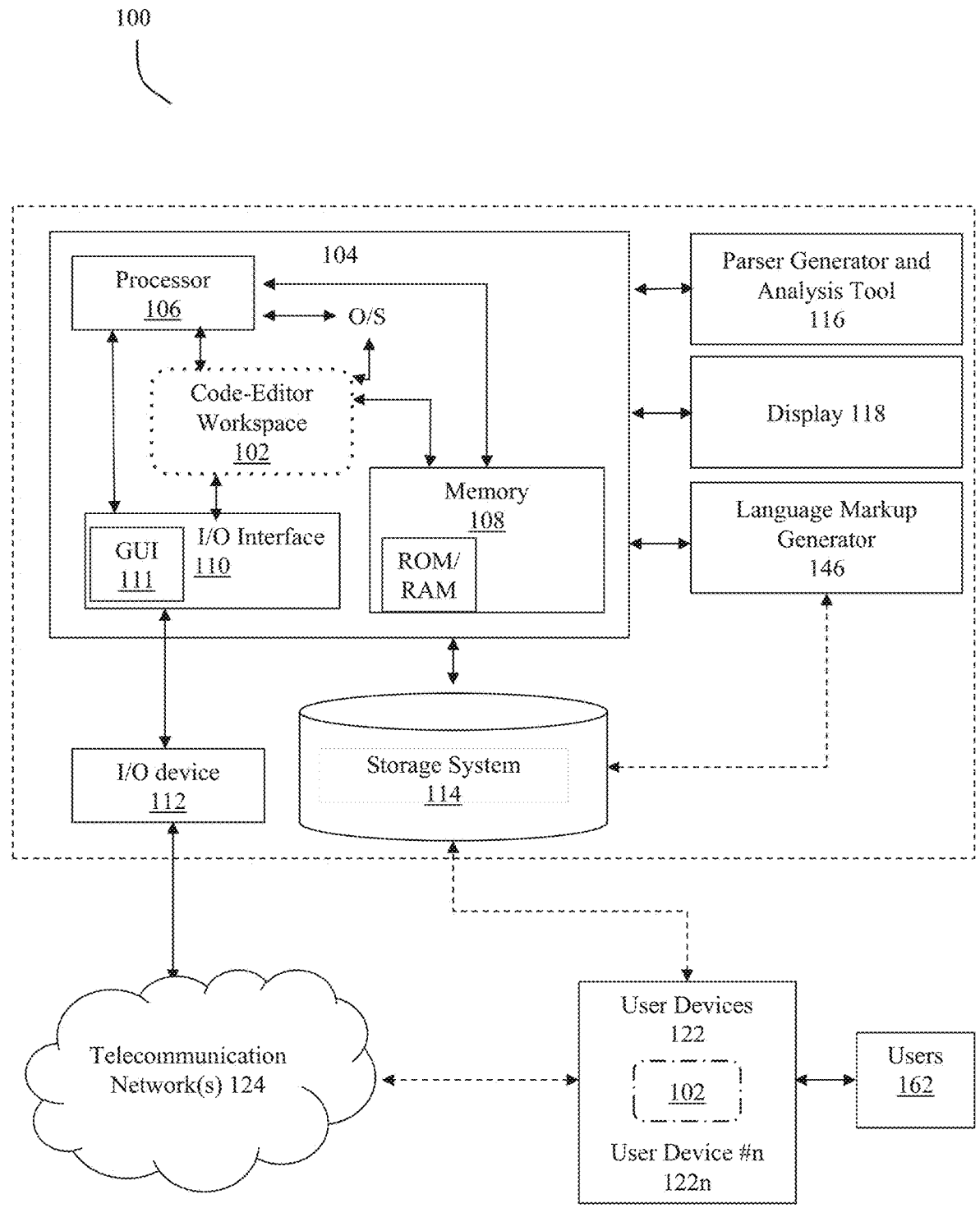
FIG. 1 depicts a diagrammatic illustrative example of a system for implementation of the present invention.

An illustrative embodiment of the present invention solves the need for hybrid development environments that better support novice programmers as they become more proficient and transition between block and text representations while still remaining accessible to beginners by presenting the same consistent drag and drop input mechanism for both blocks and text within the same environment, allowing conversion back and forth between block and text representations of source code while providing beginners with a clear visual indicator of what code can be combined to form a valid program. In particular, a strongly typed text language is selected and block shapes are used to indicate what blocks can be placed where, with specific shapes to denote different kinds of statements and other shapes to denote data types for conditions or parameters and the expression blocks that can be placed there. When converting between code and blocks, the shape of expression blocks are determined by calculating the datatype of the expression and the shape of parameter or condition slots by calculating the expected datatype. Expression types can be determined by creating or consulting a symbol table that maps variable or function names to types and parameter types can be determined by creating or consulting a symbol table that maps function names to expected type. Conditions can automatically be associated with Boolean types so no lookup may be necessary.

In accordance with one example embodiment of the present invention, the metadata is in the form of XML markup around the original source code. For instance, to support auto-indentation and indentation cleanup functions, the markup generator need only support the <block>, <statement>, <space>, <tab>, and <newline> tags. To implement the indentation cleanup function, the editor can search for statements and then find their desired indentation level by counting the number of enclosing <block> tags. The current indentation level of the statement can then be calculated by counting the number of <tab> tags and/or <space> tags between the <statement> and any preceding <newline> tags. If the current indentation level is incorrect based on the current indentation setting, tags can be inserted or removed between the <statement> and the preceding <newline>. Auto indentation can use a similar scheme but finds the desired indentation level based on where the cursor is when the enter key is pressed and the required <space> and/or <tab> tags are inserted after the newline.

In order to convert from text code to blocks the code is parsed and broken into statements, expressions, and conditions for display as blocks. One process for accomplishing this functionality is to use a parser and analysis tool to create listeners for the relevant grammar rules (e.g. each rule that identifies a statement) that wraps the matched source code in an XML tag corresponding to the detected grammar rule (e.g., <statement></statement>) and otherwise just passes through the original source code 128 so that if we strip away the XML tags, (e.g., <statement><expression>sayHello( )</expression>;</statement>) it is left with the raw source code (e.g. sayHello( );) By adding additional tags corresponding to function calls and identifiers, XML query tools can be utilized to find which identifier(s) to look up to determine the type/shape of an expression or the expected type/shape of a parameter (e.g., <statement><expression><function-call><identifier>sayHello</identifier><parameters><open-paren>(</open-paren><close-paren>)</close-paren></parameters></function-call></expression><semicolon>;</semicolon></statement>).

FIGS. 1 through 17, wherein like parts are designated by like reference numerals throughout, illustrate an example embodiment or embodiments of improved operation for a hybrid programming environment system 100 and method 700 together with a hybrid programming language, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed in a manner still in keeping with the spirit and scope of the present invention.

FIG. 1 depicts an illustrative hybrid programming environment system 100 for implementing the present invention. In particular, FIG. 1 depicts a hybrid programming environment system 100 including a code-editor workspace 102. In accordance with an example embodiment, the hybrid programming environment system 100 is a combination of hardware and software configured to carry out aspects of the present invention. In particular, the hybrid programming environment system 100 can include a computing system with specialized software and databases designed for providing a software development tool including the various aspects of the present invention. For example, the code-editor workspace 102 can be software installed on a computing device 104, a web based application provided by a computing device 104 which is accessible by computing devices (e.g., user devices 122), a cloud based application accessible by computing devices, or the like. The combination of hardware and software that make up the hybrid programming environment system 100 are specifically configured to provide a technical solution to a particular problem utilizing an unconventional combination of steps/operations to carry out aspects of the present invention. In particular, the hybrid programming environment system 100 is designed to execute a unique combination of steps to provide a novel approach to displaying, creating, and modifying source code for a program, which thereby provides a technological improvement to prior programming tool technologies.

In accordance with an example embodiment of the present invention, the hybrid programming environment system 100 can include use of a computing device 104 having a processor 106, a memory 108, an input output interface 110, input and output devices 112 and a storage system 114. Additionally, the computing device 104 can include an operating system configured to carry out operations for the applications installed thereon. As would be appreciated by one skilled in the art, the computing device 104 can include a single computing device, a collection of computing devices in a network computing system, a cloud computing infrastructure, or a combination thereof. Similarly, as would be appreciated by one of skill in the art, the storage system 114 can include any combination of computing devices configured to store and organize a collection of data. For example, storage system 114 can be a local storage device on the computing device 104, a remote database facility, or a cloud computing storage environment. The storage system 114 can also include a database management system utilizing a given database model configured to interact with a user 162 for analyzing the database data.

Continuing with FIG. 1, the hybrid programming environment system 100 can include a combination of core components to carry out the various functions of the present invention. In accordance with an example embodiment of the present invention, the hybrid programming environment system 100 can include a code-editor workspace 102, a parser and analysis tool 116, a display 118, and a language markup generator 146. As would be appreciated by one skilled in the art, the parser and analysis tool 116, the display 118, and the language markup generator 146 can include any combination of hardware and software configured to carry out the various aspects of the present invention. In particular, each of the parser and analysis tool 116, the display 118, and the language markup generator 146 are configured to provide users with a system to search data streams for particular content.

In accordance with an example embodiment of the present invention, the hybrid programming environment system 100 can include a plurality of user devices 122 configured to communicate with the code-editor workspace 102 over a telecommunication network(s) 124. The code-editor workspace 102 can act as a centralized host, for the user devices 122, providing the functionality of the modules (analysis tool 116, graphical display generator 118, and mode/view/state control tool), sharing a secured network connection. As would be appreciated by one skilled in the art, the plurality of user devices 122 can include any combination of computing devices, as described with respect to the hybrid programming environment system 100 computing device 104. For example, the computing device 104 and the plurality of user devices 122 can include any combination of servers, personal computers, laptops, tablets, smartphones, etc. In accordance with an example embodiment of the present invention, the computing devices 104, and user devices 122 are configured to establish a connection and communicate over telecommunication network(s) 124 to carry out aspects of the present invention. As would be appreciated by one skilled in the art, the telecommunication network(s) 124 can include any combination of known networks. For example, the telecommunication network(s) 124 may be combination of a mobile network, WAN, LAN, or other type of network. The telecommunication network(s) 124 can be used to exchange data between the computing devices 104 and user devices 122, to exchange data with the storage system 114, and/or to collect data from additional sources.

An illustrative embodiment of the present invention is implemented using browser technologies including Javascript, HTML, and CSS. Those familiar with the art will recognize that one can create draggable DOM elements using CSS query selectors to decide which elements to make draggable and one can cause a callback function to be called when the user begins to drag an element. Likewise one can use query selectors to determine which elements to make drop zones where draggable elements can be dropped and one can cause a callback function to be called when an element is dropped in a drop zone. Furthermore, one can restrict draggable elements from being dropped in certain drop zones by using query selectors to determine which draggable elements match which drop zones, and one can cause certain classes or attributes to be applied to a drop zone or its parent element when a matching element is dragged near it. Those skilled in the art will also recognize that CSS selectors can also be used to apply visual styles including background images, background colors, and borders of various shapes, colors, thicknesses, etc.

Figure 2A:
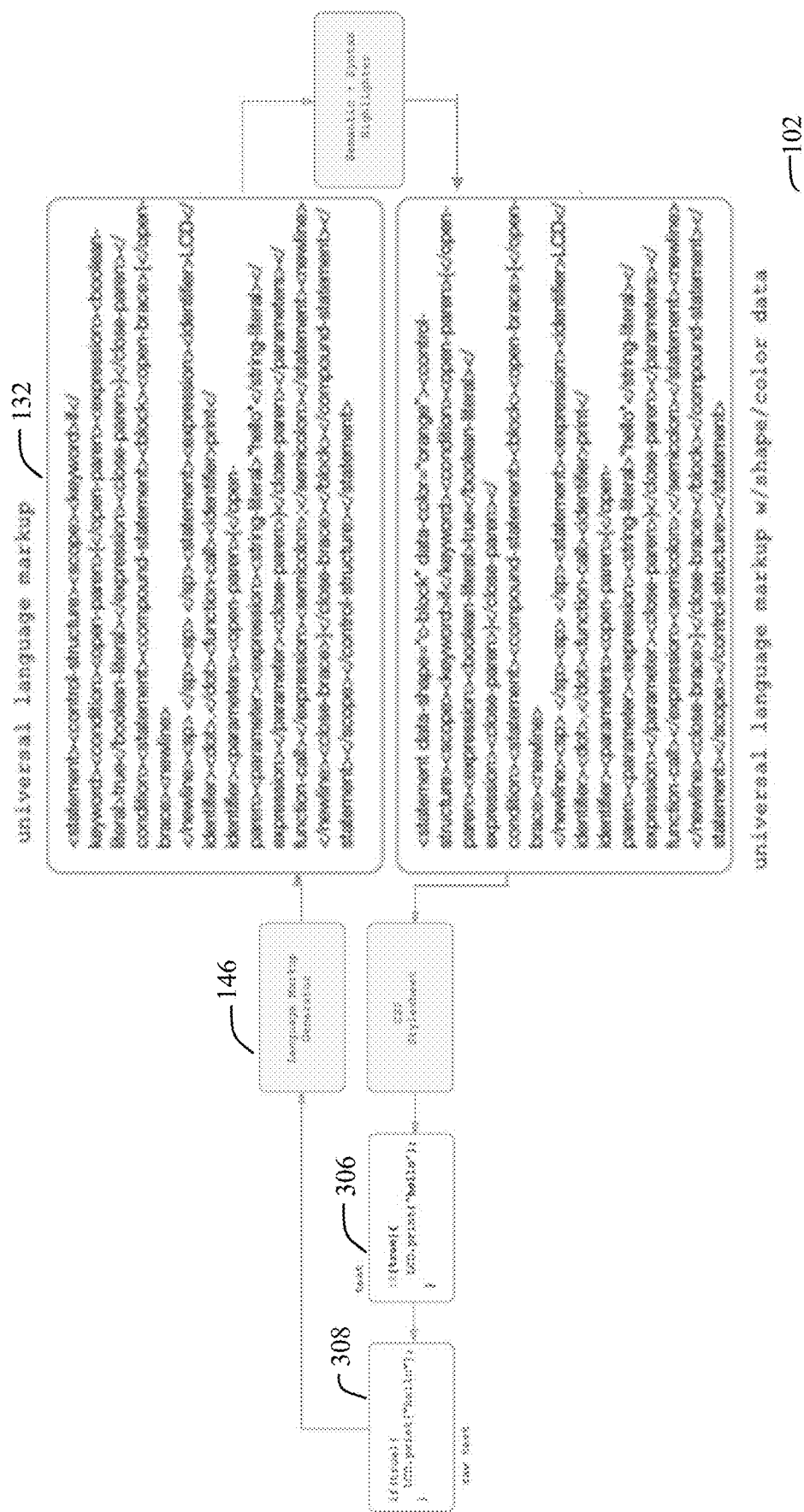
FIGS. 2A and 2B depict an example implementation of a language markup generator that provides a universal language markup, a data structure that can be used to enable all features and views of the present invention.

FIG. 2A depicts an example process for an implementation of the markup discussed herein, in accordance with an example embodiment of the present invention. In particular, FIG. 2A depicts transmitting text 380 to a language markup generator 146 which provides a universal language markup 132 of the traditional text 380. Thereafter, the universal language markup 132 is further treated to add a semantic and syntax highlighter additional markups. The semantic and syntax highlighting provides markups related to shape and color data. Thereafter, the markup is transmitted to a cascading style sheets (CSS) stylesheet and output as marked up text for display. Example features of the displayed markup text are auto-indentation, indentation cleanup, syntax highlighting, semantic highlighting, etc. This markup can be integrated within a browser without requiring callback functions or similar callback mechanisms.

Figure 2B:
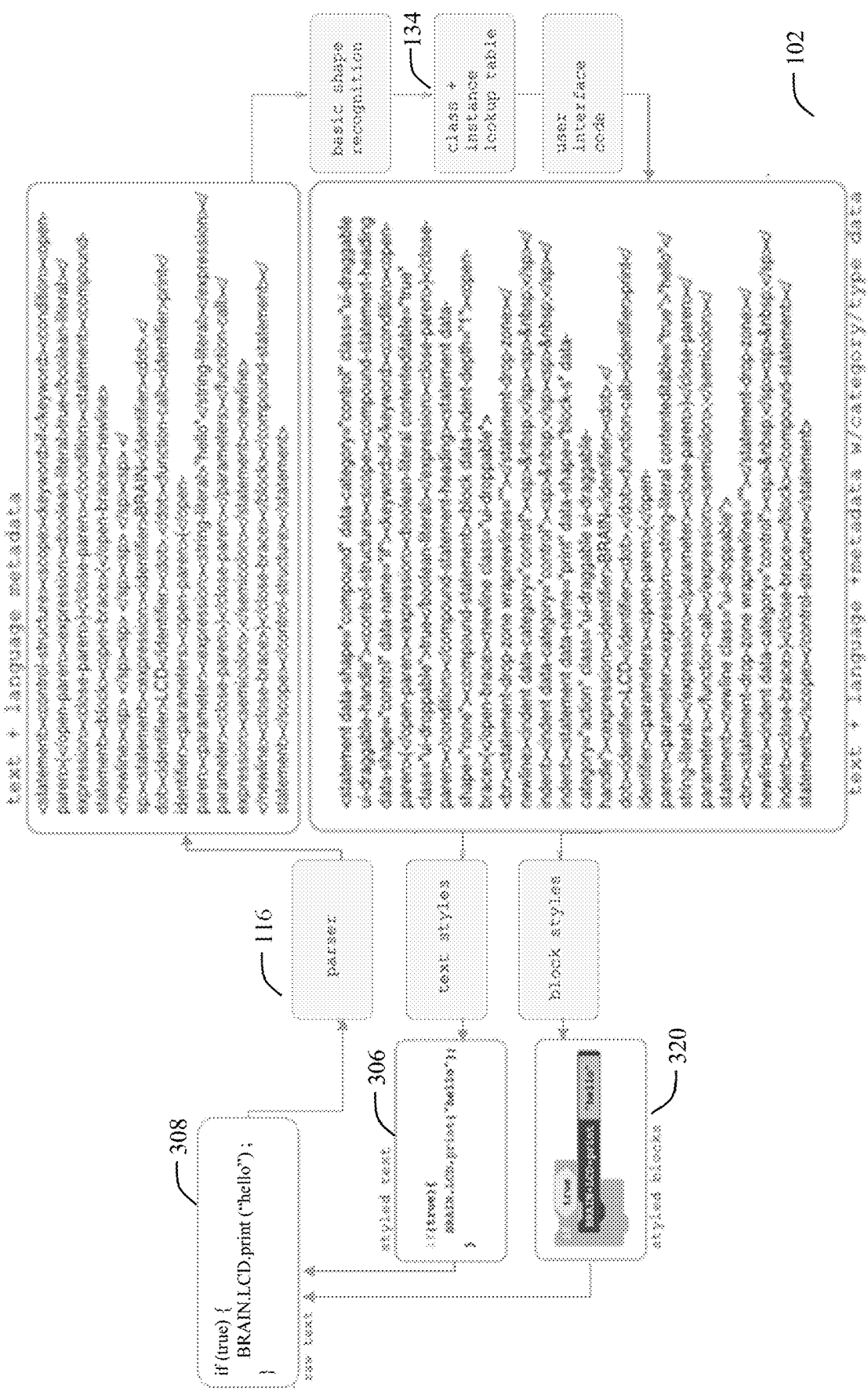
Figure 2C:
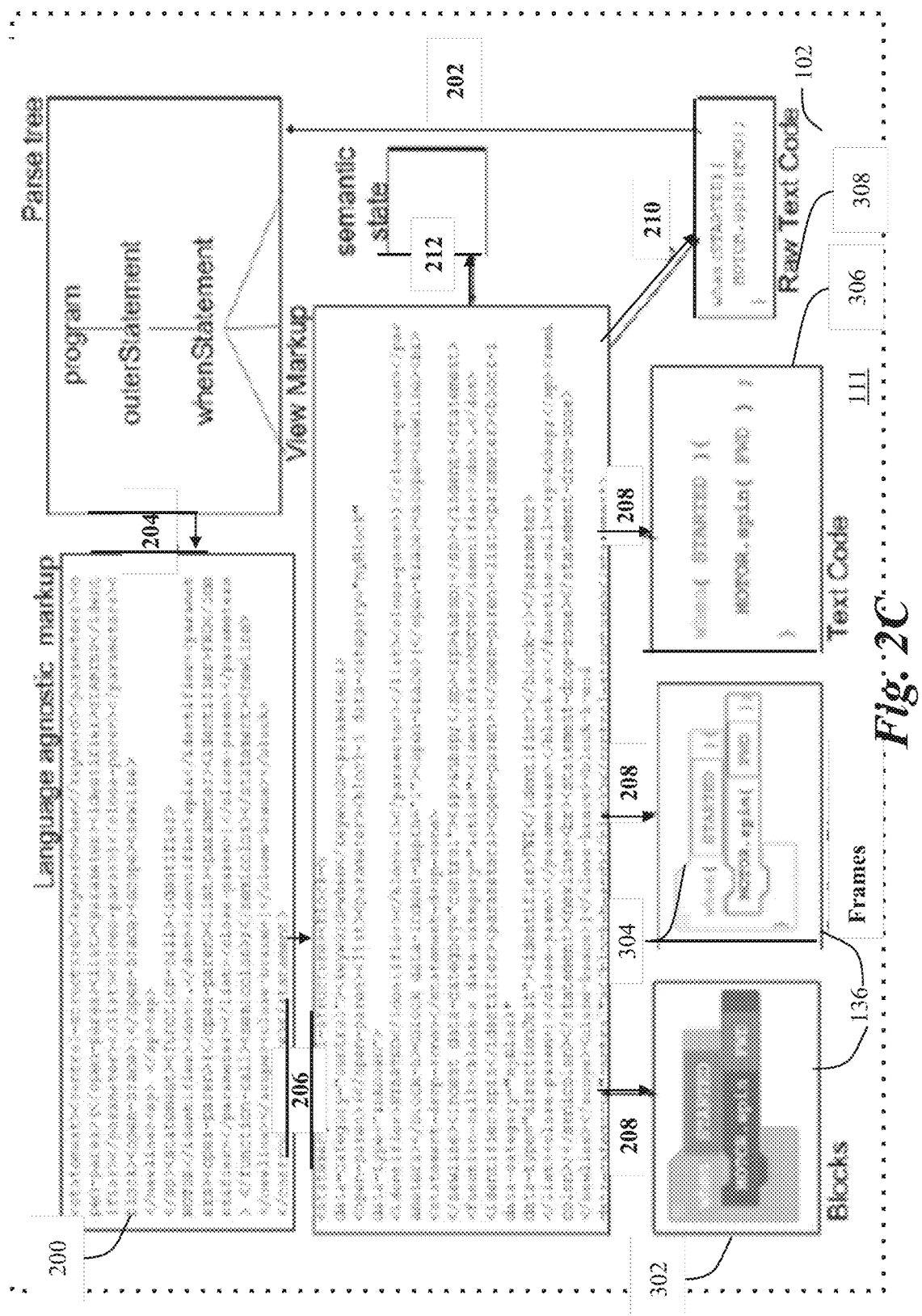
FIG. 2C is an illustrative example of an interface for creating, modifying, and displaying code in accordance with the present invention.
Figure 2D:
FIG. 2D depicts how the embodiment illustrated in FIGS. 2A and 2B is just one possible embodiment as the basic shape metadata is known at parse time and the parser and shape recognition steps can be combined.
Figure 3:
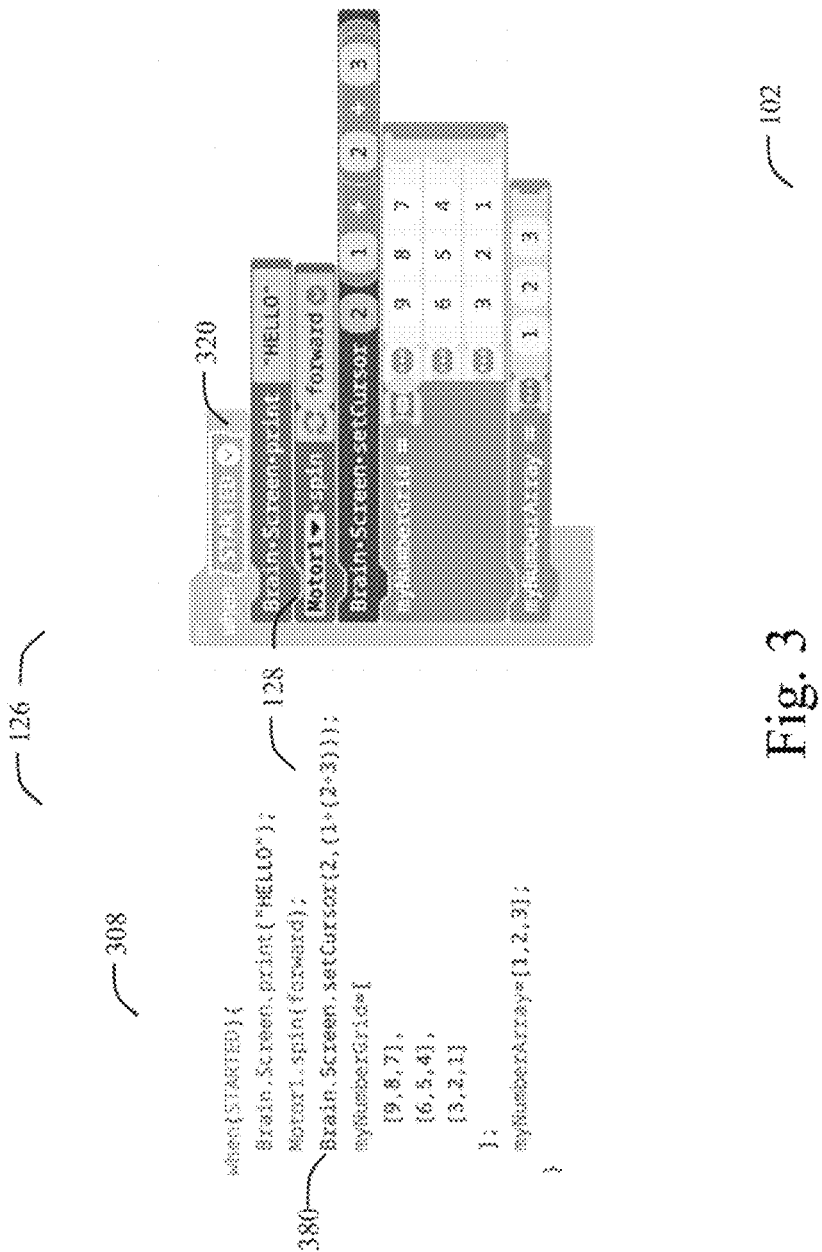
FIG. 3 depicts an example display of the text styling of the source code and a block styling of the source code.

FIG. 2B depicts how block or text display are style changes of the source code 128, in accordance with an example embodiment of the present invention. While many styles such as font size can be shared between blocks and code, others like font color may benefit from different styling altogether. Consider the statement BRAIN.LCD.print("Hello"); as seen in FIG. 2B. When in block mode, the font color of the identifiers can be white to contrast with the blue color of the block, but when in text mode, the color can be blue to correspond to the blue block in block mode and to contrast with the white background. In this way, text snippets that correspond to a block will have the same predominant color as the block, and in the case of blocks being colored by category, would also be colored by category themselves. This can all be done using CSS by setting different styles on identifiers that are direct children of statement elements, when a CSS class exists to indicate blocks or to indicate text. But the color (or the category that indicates color) itself need first be calculated and added to the statement as an attribute so that the CSS rules can use it. The category can be calculated by consulting a class and instance lookup table. FIG. 2C depicts a parse tree process 200 for creating a code markup enabling multiple representative views of source code. FIG. 3 depicts an example display of the text styling of the source code 128 and a block styling of the source code 128. FIG. 2D depicts how the previously described embodiment is just one possible embodiment and that the basic shape metadata (whether a code snippet is a statement, compound statement, control structure, etc.) is known at parse time and the parser and shape recognition steps can be combined. For a strongly typed language however, the type of parameters or expressions would not generally be known at parse time thus the illustrative example focuses on determining the shape after the parser adds language metadata. While fully integrating the text and block editors helps to coordinate settings and implementations of well-defined block and text interfaces such as block and text color, it also begins to suggest new interactions not previously possible. Because text is just another style to display code, all block user interactions are still available to text code. With no additional programming, text code is draggable just like blocks and will only fit where it makes sense (syntax and semantics wise) just like blocks. With a slightly different dragging and drop zone style, text being draggable even highlights where it will go and pushes the other text out of the way just like blocks.

In accordance with an example embodiment of the present invention, those skilled in the art would recognize that FIG. 2B illustrates how draggable blocks and text code snippets can be created by adding metadata in the form of classes such as "ui-draggable" to an element that should be draggable along with its child nodes, "ui-draggable-handle" to an element that should initiate the drag, and "ui-droppable" to elements that should accept a dropped block. Drop zone elements may be added to the markup by user interface code to provide visual feedback that a block or snippet can be dropped there, but hidden by CSS styles until a compatible element is dragged within drop range causing an added class in its parent element which will show the drop zone. For a strongly typed language, a class and instance lookup table can be consulted to add expected parameter types as attributes to restrict dropping to only the accepted types where draggable elements would also have attributes added based on their types. Callbacks registered to fire when elements are dragged can remove it from its current location using DOM methods and callbacks registered to fire when elements are dropped can simply remove the element that accepted the drop and replace it with the dragged element. As mentioned previously, the mechanisms for callbacks and for finding and registering draggables based on CSS selectors and then restricting dropping also based on selectors are well known in the art. It is the parsing of source code into universal language markup and further processing to add semantic data, and then the direct addition of the markup to the DOM that enables this.

FIG. 2C depicts a graphical user interface 111 of the code-editor workspace 102 for creating, modifying, and displaying source code 128 in accordance with the present invention. The code-editor workspace 102 includes source code 128 displayed in multiple code-editor panes 136 using a plurality of presentation views 126 including a text view 308, a frame view 304, a programming language block view 302, and an intermediate notes view 306. The user 162 may select and control each of the code-editor panes 136 and each of the presentation views 126.

FIG. 3 depicts an example display of the text styling of the source code and a block styling of the source code, in accordance with an example embodiment of the present invention.

Figure 4A:
FIG. 4A depicts how a class and instance lookup table can be created from an API based on the current instances of any variables or objects. From this instance table one can look up what methods or properties a given instance has even if that instance is nested as a sub-object of another object or sub-object.

FIG. 4A depicts how a class and instance lookup table can be created from an API based on the current instances of any variables or objects, in accordance with an example embodiment of the present invention. From this instance table one can look up what methods or properties a given instance has even if that instance is nested as a sub-object of another object or sub-object.

FIGS. 4B, 4C, 4D, and 4E depict various components and states of the automatic detection and display of a block (and/or text) API and how various user interface elements interact with the state of the program, in accordance with an example embodiment of the present invention.

Figure 5A:
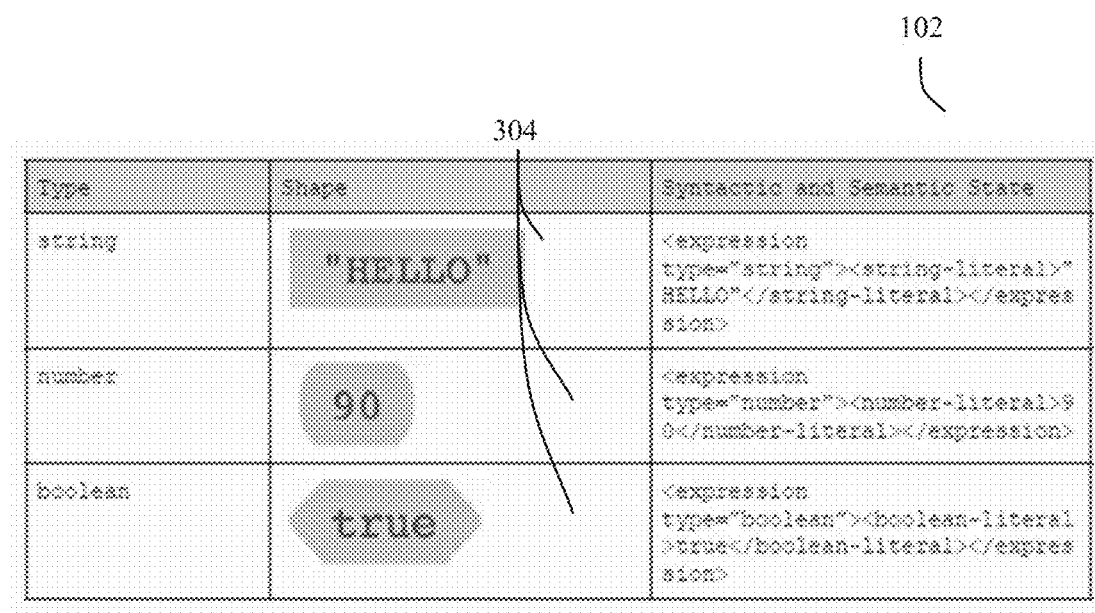
FIGS. 5A and 5B depict framing of string, number, and boolean types.
Figure 5B:
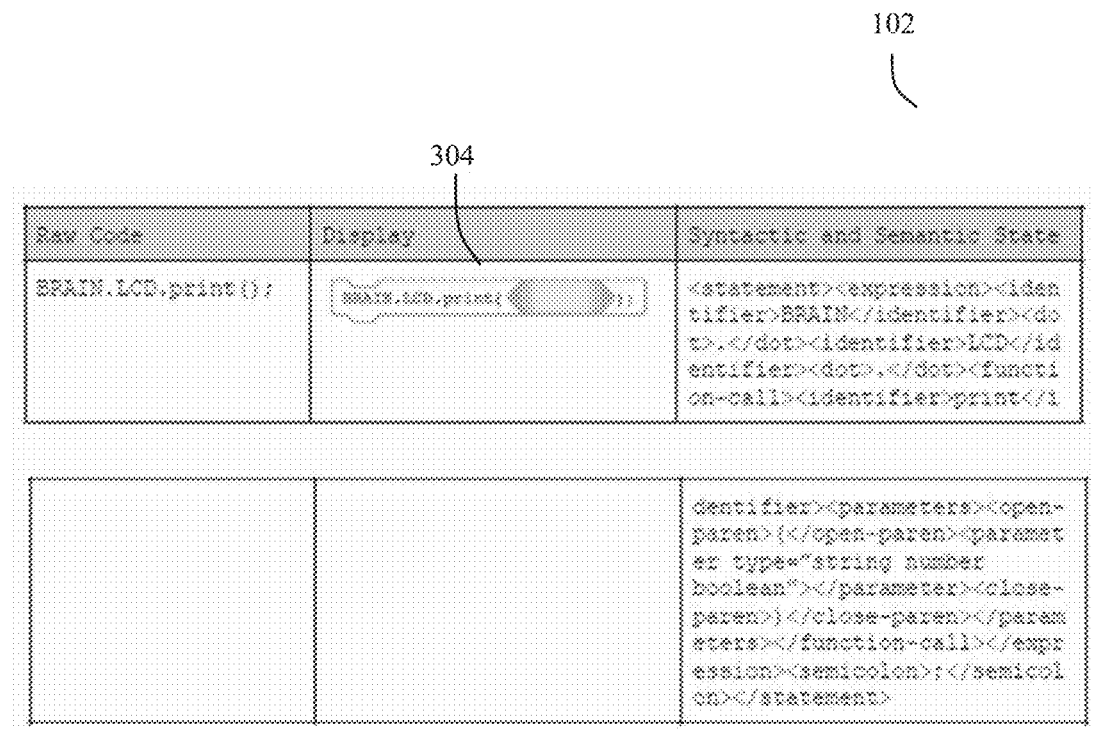

FIGS. 5A and 5B depict framing of string, number, and boolean types, in accordance with an example embodiment of the present invention.

Figure 6A:
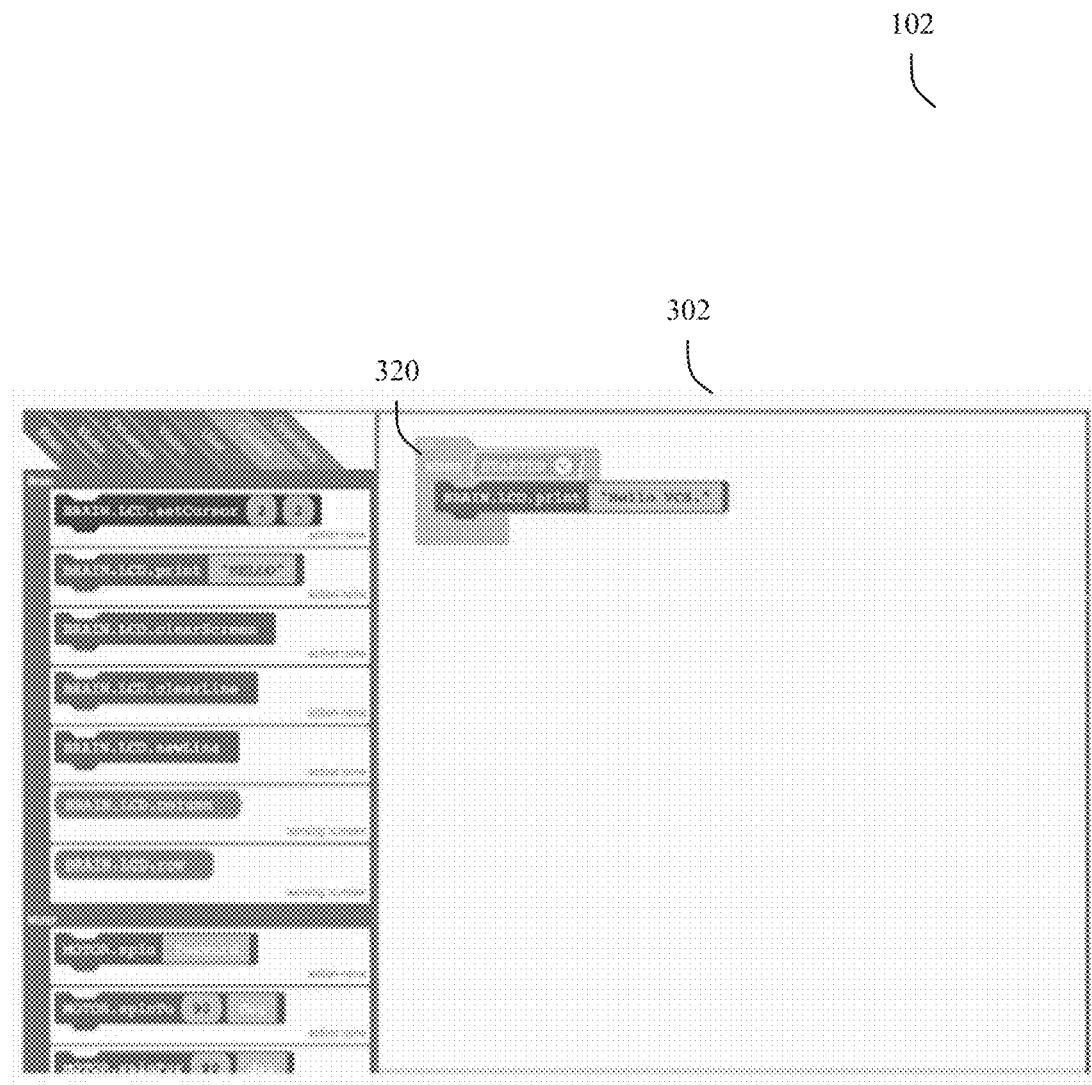
FIGS. 6A, 6B, and 6C depict a block view and how shapes provide suggestions for how blocks of different data types may be connected.
Figure 6B:
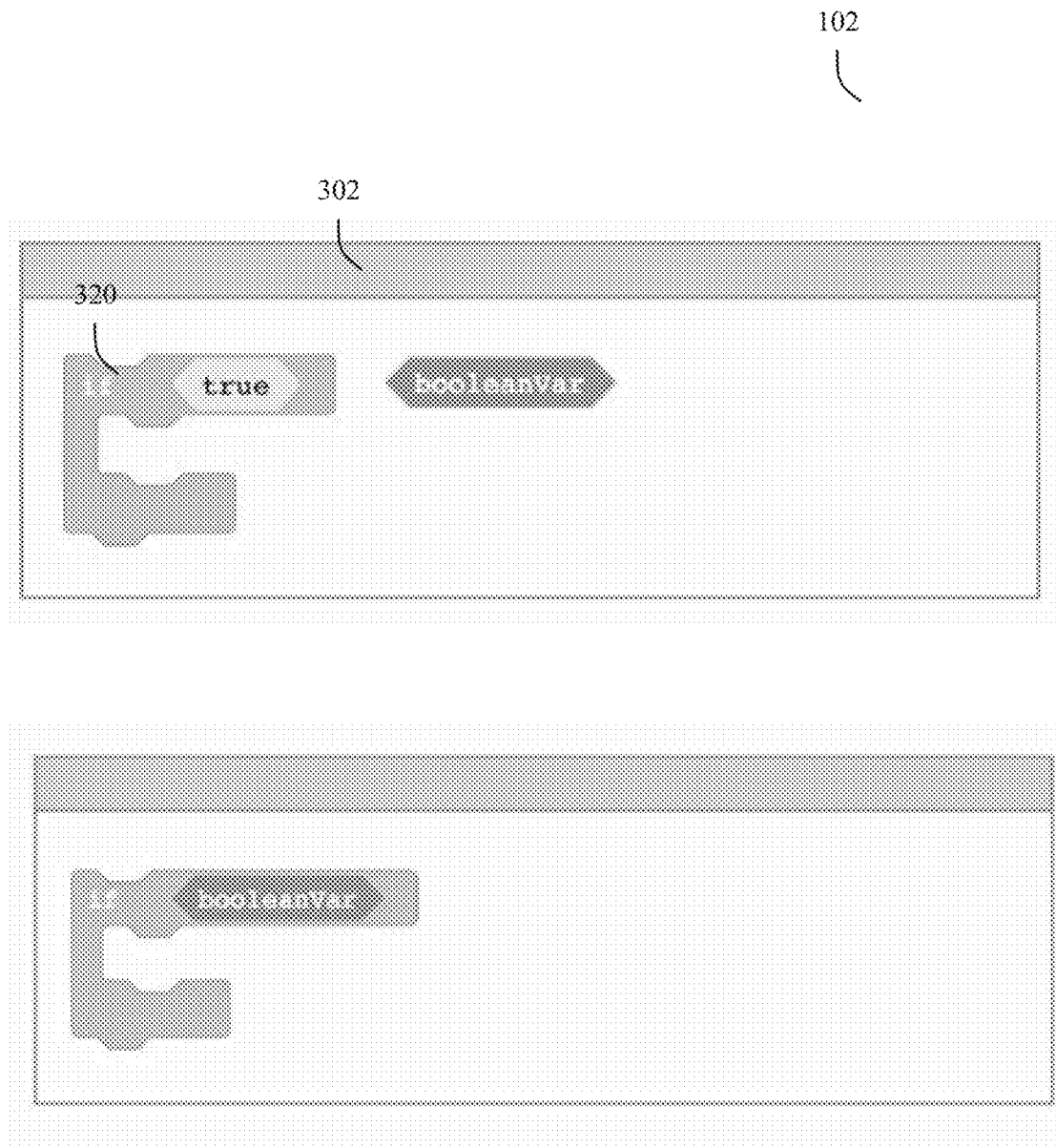
Figure 6C:
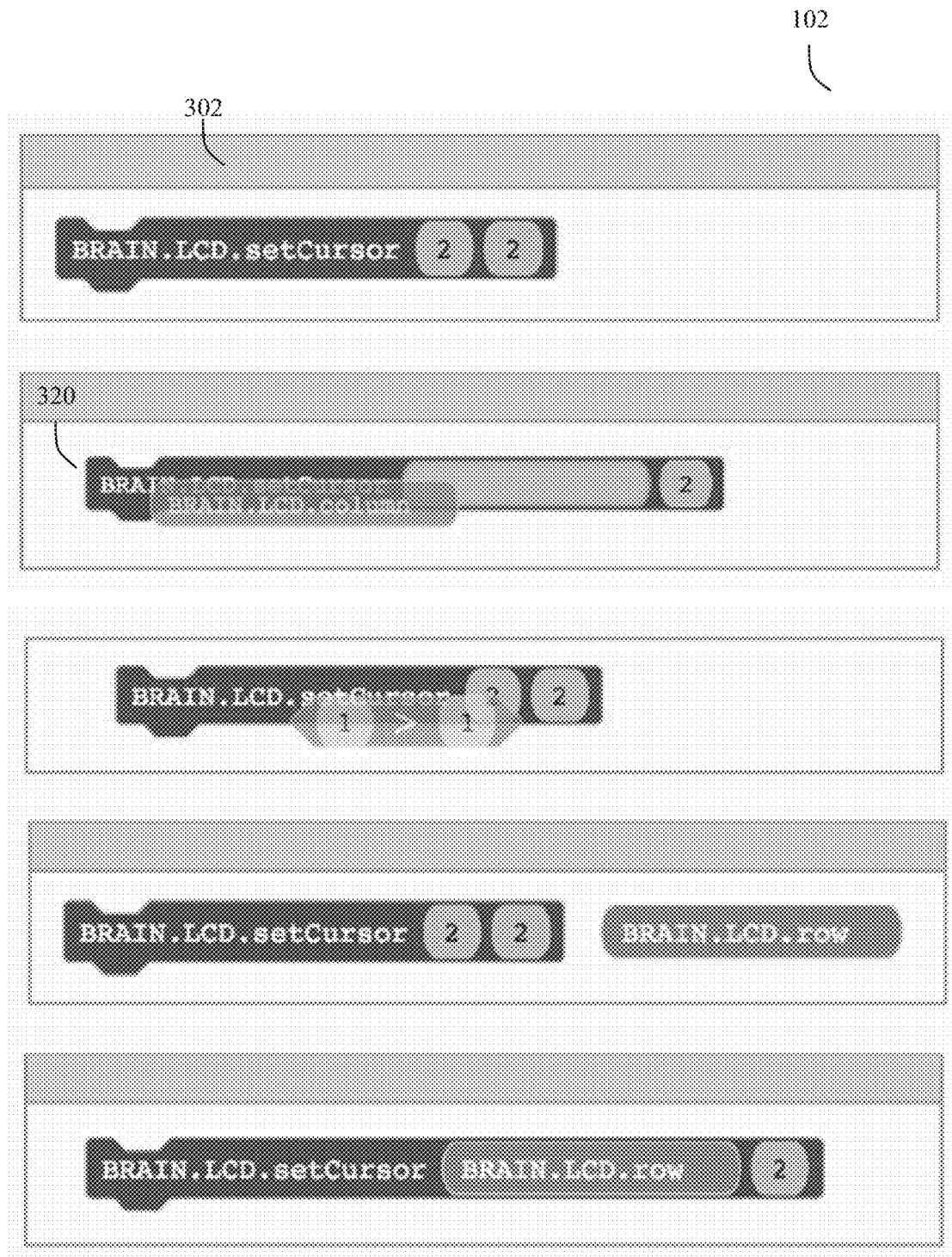
Figure 7A:
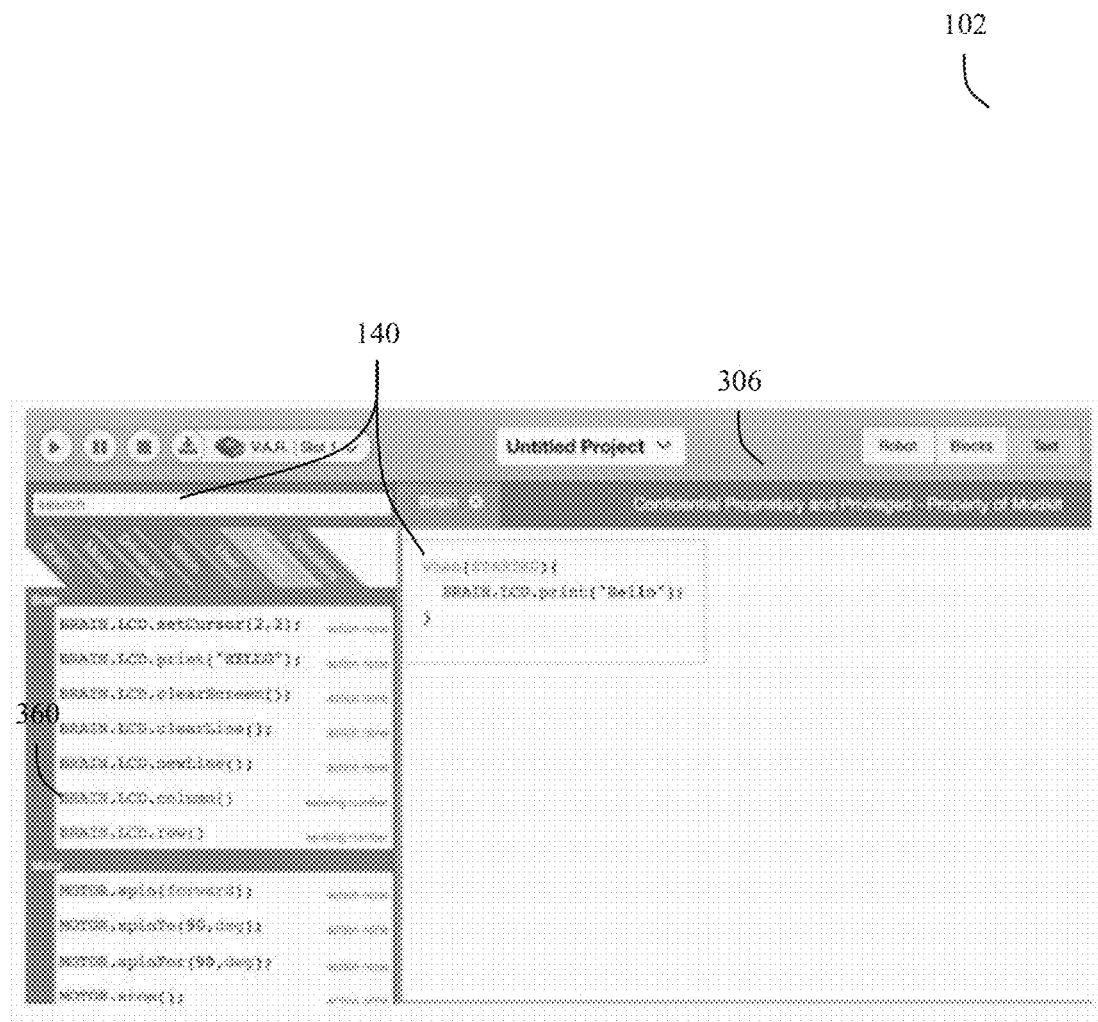
Figure 7C:
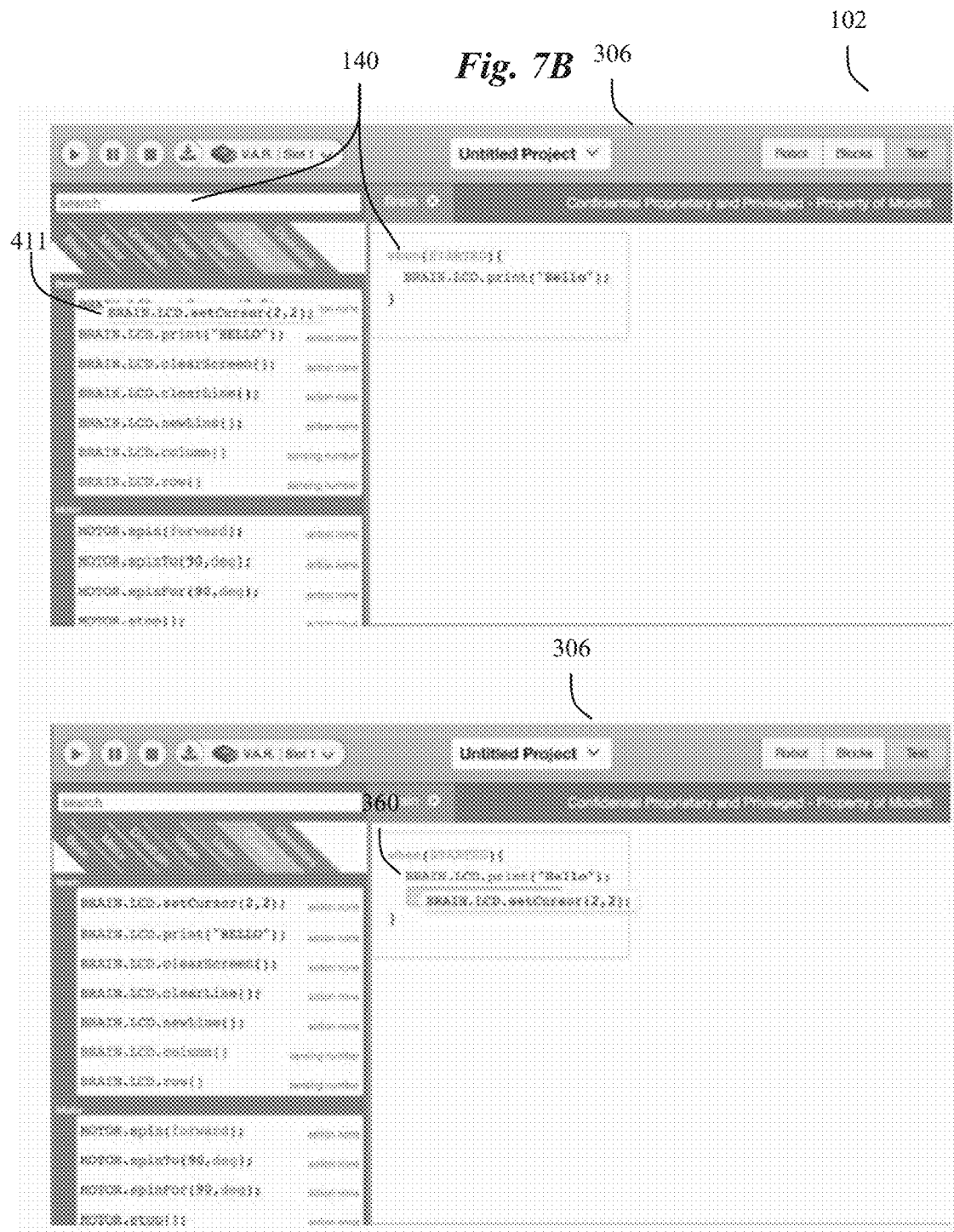
Figure 7D:
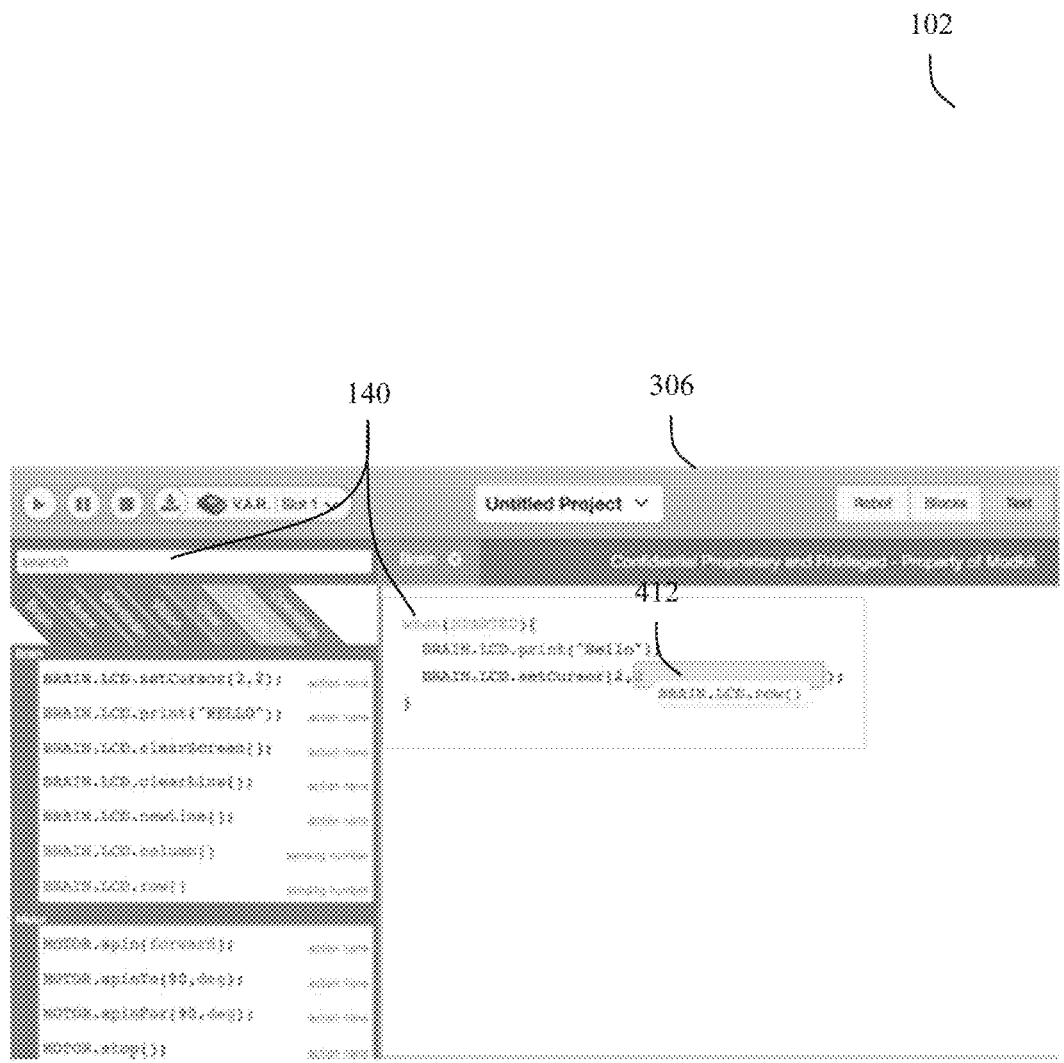

FIGS. 6A, 6B, and 6C depict a block view and how shapes provide suggestions for how blocks of different data types may be connected, in accordance with an example embodiment of the present invention. A programming language block view 302 provides a programming interface with programming language blocks 320 including properties consistent with programming blocks known in the art, as depicted in FIG. 6A as the block view 302. Some of traditional functionalities of programming language blocks 320 include fixed block shapes and functions as defined by the block programming language. By design, the blocks 320 limit which displayed text can be edited and how that text can be edited. For example, some of the alphanumeric values of FIG. 6A are editable through identifiable attributes 322 of user interface elements 411 (e.g., by outlines, shading, arrows, dropdowns, etc.). However, the blocks 320 also include alphanumeric values that are not editable in the non-editable graphical elements 324. For example, the alphanumeric values in the blocks 320 without any special graphical identification (e.g., drop downs, outlines, etc.) are not editable. Such functionality is typical in conventional block programming interfaces. Additionally, the blocks 320 are draggable in places where text is not editable (e.g. by typing or dropdowns). FIG. 6B depicts how conditions such as "if" accept boolean expressions and how the shape of the condition matches the shape of the expression to provide guidance to the user. This is consistent with programming blocks known in the art. FIG. 6C depicts how blocks can stretch to provide visual feedback to suggest that the block will be accepted (the "BRAIN.LCD.column" number) and will not provide this feedback when the block will not be accepted (the "1>1" boolean block). FIG. 6C also depicts visual polymorphism based on type information where the print block has shapes indicating multiple types will be accepted as parameters because the print function has been overloaded in the corresponding C++ code (as depicting in FIG. 4A).

FIGS. 7A, 7B, 7C, and 7D depict snippets of draggable text code that only drop where they make syntactic and semantic sense, in accordance with an example embodiment of the present invention. As text code is simply just another view of the same source code displayed in block modes, the same implementation of drag and drop can be used across blocks and code simply changing the styles to offer different visual feedback. In accordance with an example embodiment of the present invention, drag and drop of source code snippets begins by allowing the user to select a source code snippet and then generating, based on the selected source code snippet, user interface elements 411 comprising a representation of the selected source code snippet (in this case a text representation) with visual cues and feedback indicating the graphical user interface 111 allows placement by dragging and dropping of user interface elements 411 and providing, based on input 140 from the user, the textual representation of the selected source code snippet as draggable, providing feedback indicating where the textual representation will go 412. Because the example embodiment uses XML within a web browser's DOM this can all be achieved by cloning the DOM element on mousedown and using CSS styles to display the feedback. CSS styles may then be activated on drop zones by adding or removing CSS classes to indicate that the dragged snippet will go 412 there. Once a snippet is dropped (mouseup), or after the user types or deletes (edits) source code, the present invention can reparse the combination of the source code already present along with the dropped snippet (in this case the textual representation) with a parser and identify additional drop zones, where drop zones match syntactic elements including the group consisting of parameters, conditions, whitespace and combinations thereof. This reparsing allows the present invention to restrict, by the code editor workspace and the graphical user interface, a selected source code snippet (in this case the textual representation) from being inserted where the selected source code snippet is incompatible with one or more of the group consisting of syntax, semantics and combinations thereof of source code already present, and allowing the selected source code snippet only to be dropped where metadata indicates the selected source code snippet will fit into the source code already present, wherein positive feedback can be presented indicating that upon dropping the selected source code snippet is proper and inserted in a correct position as indicated by the metadata. By integrating the dropped snippet (in this case textual representation) with the text of source code already present, all text code, comprising both the source code already present and the dropped snippet, is editable by typing (receiving keystrokes from the user by an input-output interface communicating with the processor of the computing device 104) and deleting portions of the source code in response to delete or backspace keystrokes (or other input from the user by an input-output interface communicating with the processor of the computing device 104), thereby generating a hybrid view in the code-editor workspace 102 using the graphical user interface 111 that combines a text view comprising a human-readable text display of the source code edited by keystrokes typed by the user with selected source code snippet placement by dragging and dropping of user interface elements, that is restricted by one or more of the group consisting of syntax, semantics and combinations thereof, in a single view.

In an example embodiment of the present invention, the metadata used to determine whether the selected source code snippet is syntactically compatible with a drop zone within the source code to determine if the user should be directed to drag it there or restricted from dropping it there is based on the parsing of the source code to generate the drop zone and the parsing of the snippet being dragged (for draggable snippets this parsing can be done by a human but is less labor intensive to be done by a parser). For example if the snippet is parsed and receives metadata to indicate that it is a statement (including a compound statement), only statement dropzones will be valid. In the programming language used in an example embodiment a statement dropzone is identified as whitespace (newlines, spaces, tabs, etc.) outside statements but inside compound statements. In an example embodiment, universal language markup is created by the parser step, finding such whitespace is then done by querying the markup for <compound-statement> elements and then iterating through its children elements comparing them to whitespace elements such as spaces, tabs, and newlines, adding metadata indicating a statement dropzone directly to the matched elements as attributes. Then while dragging the statement, the dropzone near the cursor position can be queried and rejected if they don't have the statement dropzone attribute. For a draggable snippet identified during parsing and marked with metadata as an expression, an additional lookup is needed to determine its semantic restriction (data type). Symbol tables, instance tables and class tables can then be queried to look up the expression's type by its identifier. For instance an expression consisting of a class function (method) call would be broken into the class instance identifier and the function call identifier. The class instance can be looked up in the symbol table to determine its class. Then the function identifier can be looked up in a class table to determine its return type, for example a number type. The return type will then determine which drop zones the expression can be dropped in. A similar lookup table can be used where non class-based functions or variables are used, and has similar functionality. The dropzones that the function call are compatible with also need to be determined. In an example embodiment of the present invention, this is done in a similar manner by parsing the source code and generating universal markup including <function-call>, <parameter> and <condition> tags 144. If the expression has metadata indicating that it is or returns a boolean type, it will match with condition tags 144 without any further lookup. But for parameters which can take different types, the same symbol tables, instance tables and class tables can be used to determine the function call's parameter types in the same way a function call's return type is identified. Once the function call's parameter types are determined these can be stored as metadata by adding attributes to the individual <parameter> tags 144. Upon dragging the dropzones near the cursor position can be queried and rejected if they do not have the correct data type metadata as an attribute. Also while an example embodiment uses universal markup to store this metadata for quick lookup, the parsing and identification could be done in many ways including combining all the steps in real time to create and look up compatible drop zones while dragging.

Figure 9A:
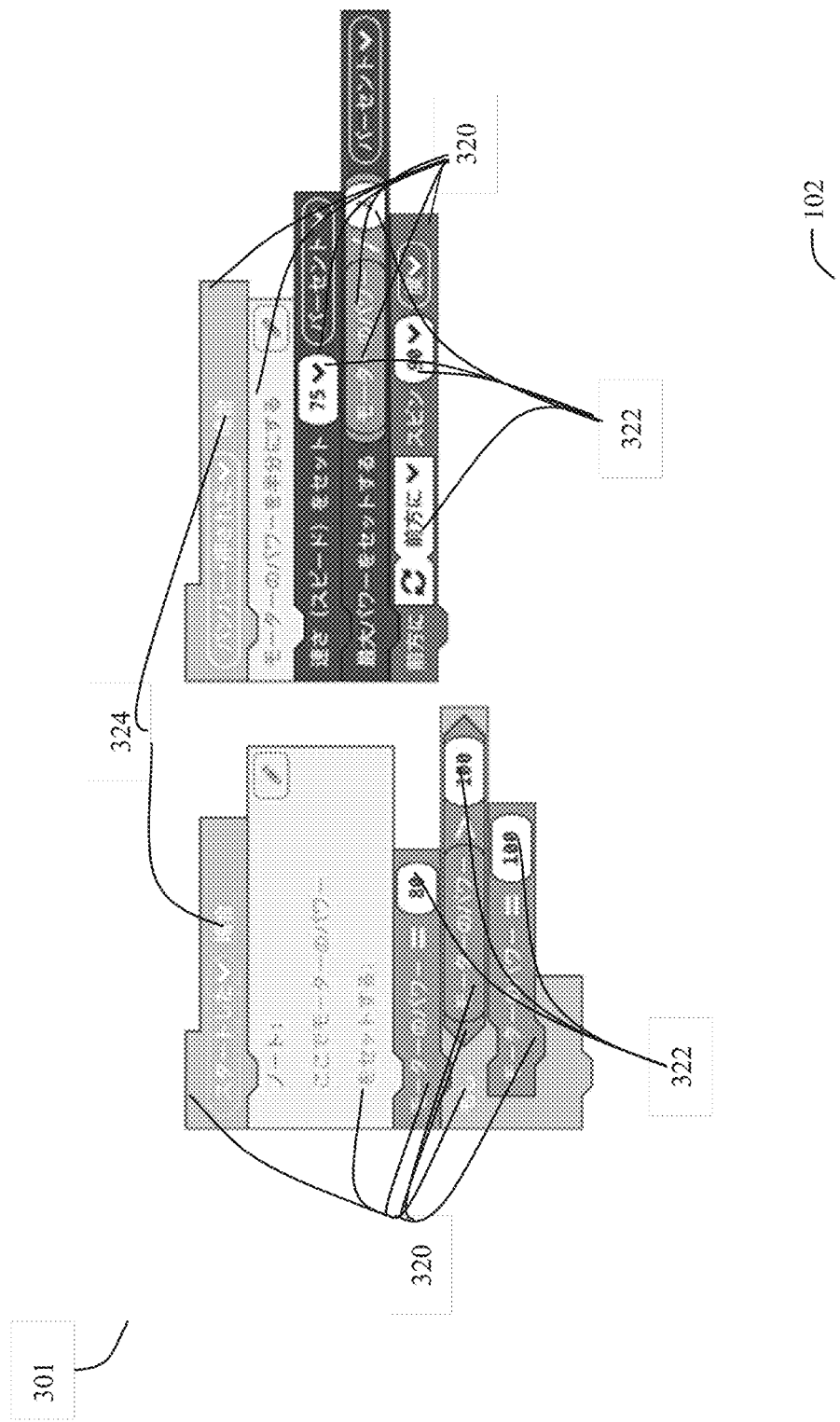
Figure 9B:
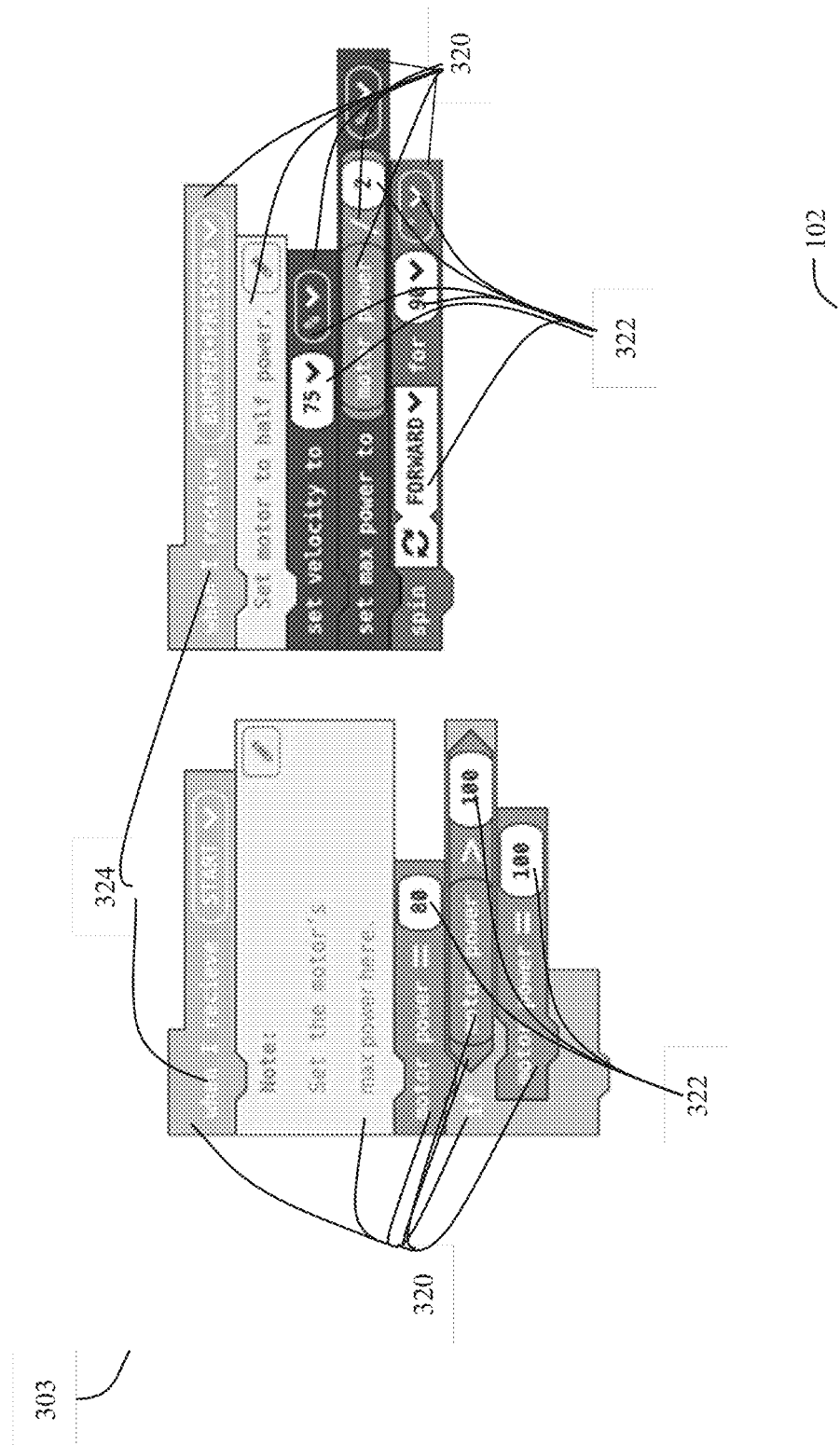

FIGS. 9A and 9B depict natural language blocks views which are block views presented in the human language of the user, in accordance with an example embodiment of the present invention. Natural language syntax is used which makes this view approachable by the youngest users and by non-English native speakers.

Figure 9C:
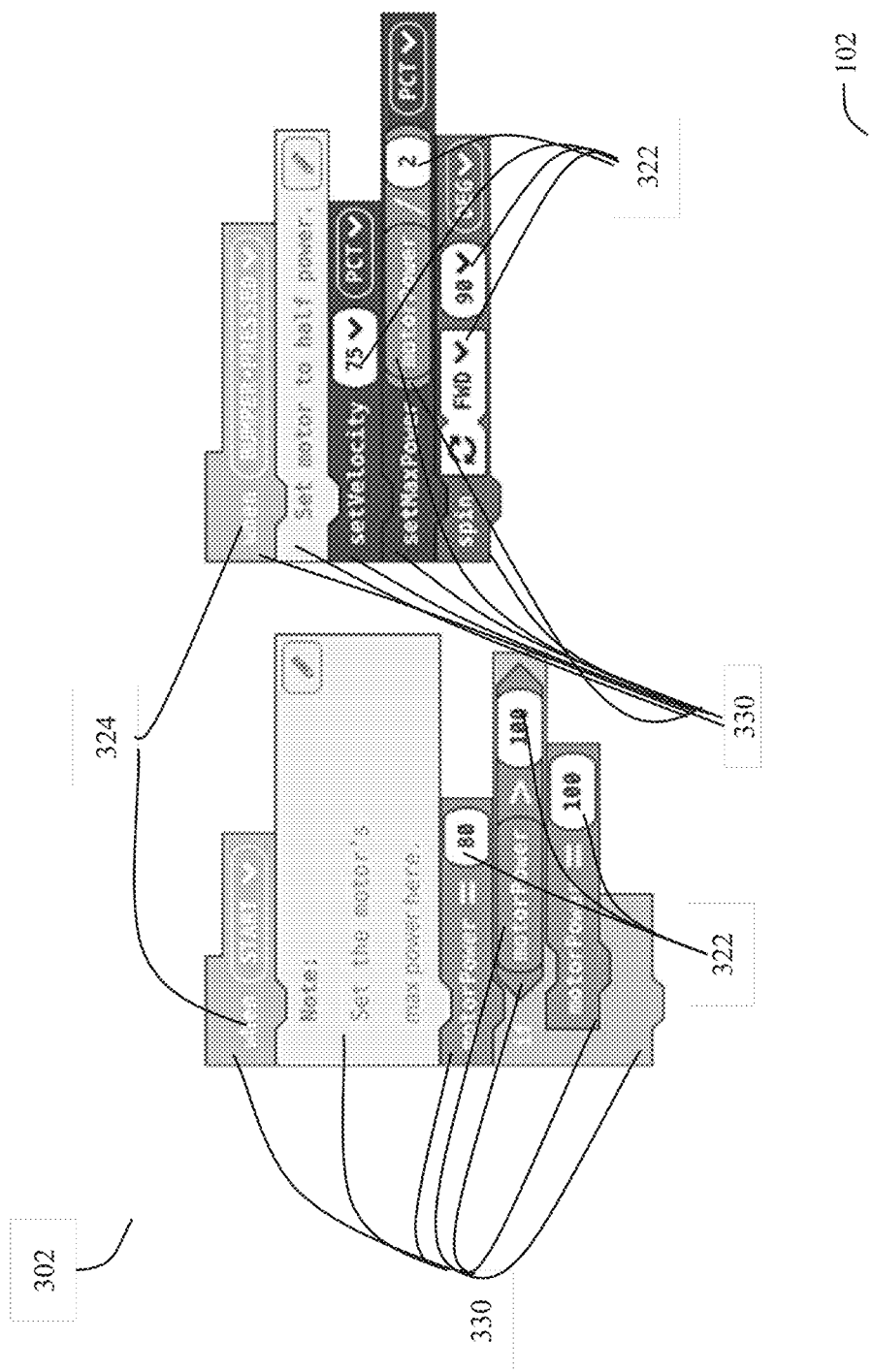

FIG. 9C depicts a programming language blocks view which is a block view using the basic syntax of an underlying programming language, in accordance with an example embodiment of the present invention. Verbose syntax like commas, parentheses, and semicolons are generally omitted in this view. This view makes moving from blocks to traditional programming languages easier as there is less change in syntax than when moving directly from natural language.

Figure 8:
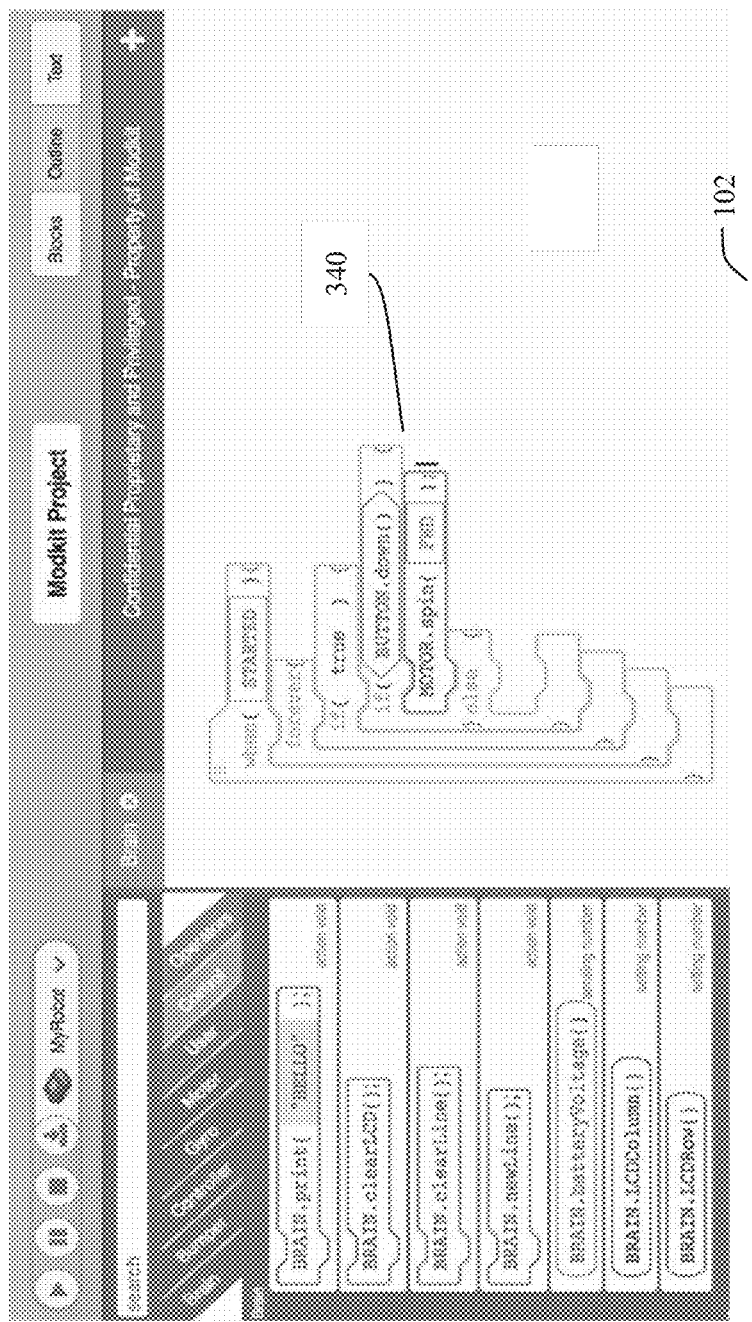
FIG. 8 depicts a frame view which provides unique positive visual feedback when correct code is constructed and negative feedback when code is removed or is not correct.
Figure 9D:
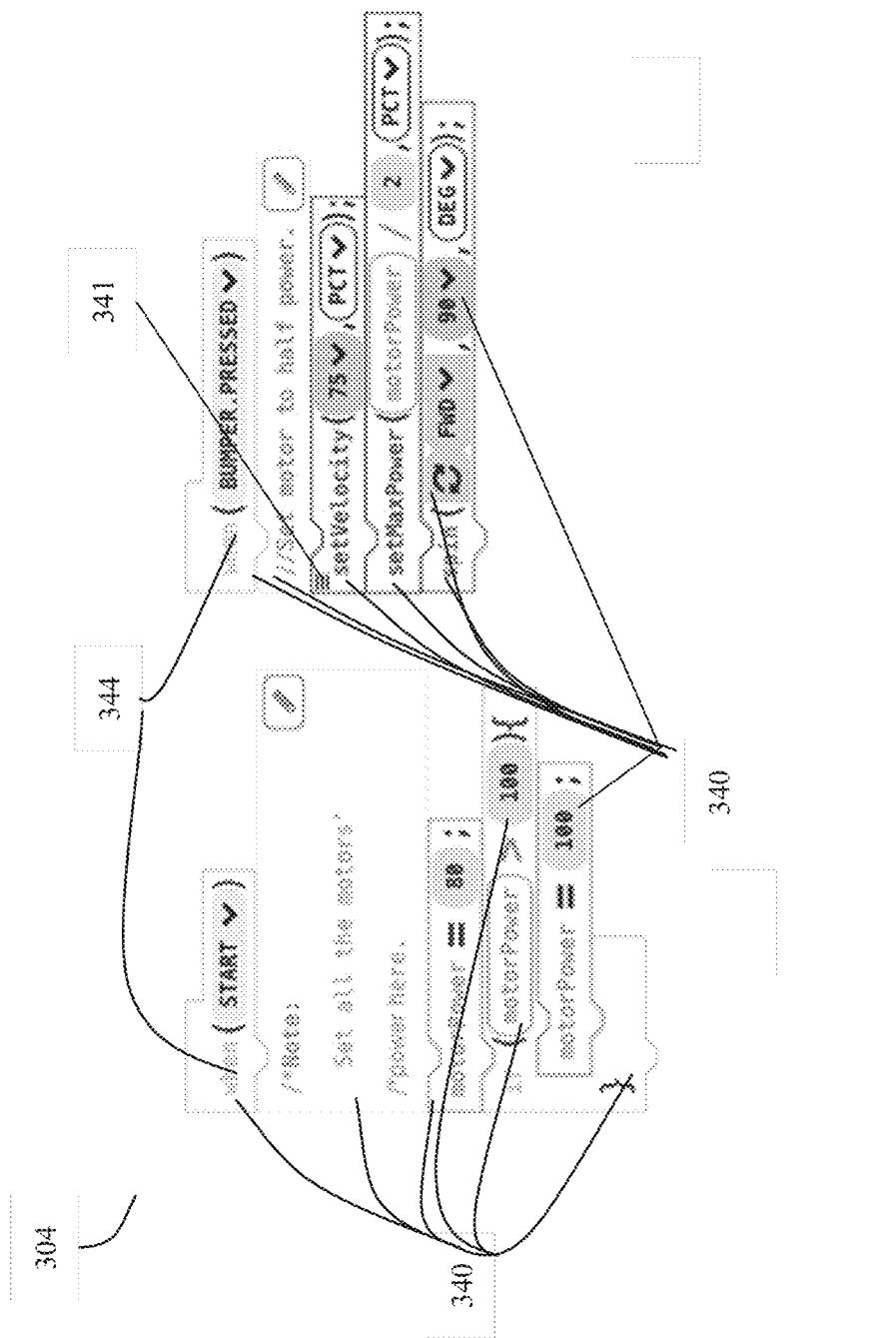

FIGS. 8 and 9D depict a frame view that provides unique visual positive feedback when correct code is constructed and negative feedback when code is removed or is not correct, in accordance with an example embodiment of the present invention. Frame view is in between block and text views where text is freely typed and code snippets are also draggable. Code is framed (lines, outlines, partially enclosed shapes, fully enclosed shapes, or an enclosed perimeter are drawn around an identified syntactic element) as the user types to provide unique visual positive feedback (addition of frames familiar to block users) when correct code is constructed and negative feedback (removal of frames) when code is removed or is not correct.

In accordance with the present invention, like all views, frame view can be implemented using the same universal language markup system. Framing begins by receiving keystrokes from the user by an input-output interface communicating with the processor of the computing device 104 and based on the keystrokes, creating or editing source code within the editor workspace. An example embodiment of the present invention then parses the source code within the editor workspace, using a parser, and identifies one or more of the group of syntactic elements, semantic attributes, and combinations thereof, where syntactic elements consist of one or more of the group consisting of statements, expressions, identifiers, keywords, compound statements, control structures, literal values, function calls, and combinations thereof and where semantic attributes consist of one or more of the group consisting of expected data-types of parameters, return types of function calls, types of literal values, types of identifiers, types of variables, and combinations thereof and generating visual cues and feedback, indicating one or more of the group consisting of the syntactic element, the semantic attribute, and combinations thereof was identified, comprising emphasizing the identified syntactic elements using one or more of the group consisting of lines, outlines, partially enclosed shapes, fully enclosed shapes, an enclosed perimeter around the identified syntactic elements, and combinations thereof. Any edits based on a user typing (receiving keystrokes) is integrated with the code already present, wherein all text code, comprising both the source code already present and the edits based on the received keystrokes, is editable (by e.g., using received keystrokes received from the user by an input-output interface communicating with the processor of the computing device 104) and deletable (defined herein as being capable of being deleted, by e.g., using received keystrokes received from the user by an input-output interface communicating with the processor of the computing device 104). Frame view is thus a hybrid view that uses the graphical user interface 111 that combines a traditional text view comprising a human-readable text display of the source code edited by keystrokes typed by the user with framing of identified syntactic elements consisting of statements, expressions, identifiers, keywords, compound statements, control structures, literal values, function calls, and combination thereof and generating visual cues and feedback, indicating the syntactic element was identified, comprising framing of identified syntactic elements using one or more of the group consisting of lines, outlines, partially enclosed shapes, fully enclosed shapes, an enclosed perimeter around the identified syntactic elements, and combinations thereof, in a single view. In accordance with the present invention feedback is also generated indicating the graphical user interface 111 allows placement by dragging and dropping of a selected source code snippet. This may comprise one or more of the group consisting of feedback based on metadata for cursor proximity, additional user interface elements, and drag handles 341 indicating where the selected code snippet is allowed to be dragged from.

Figure 9E:
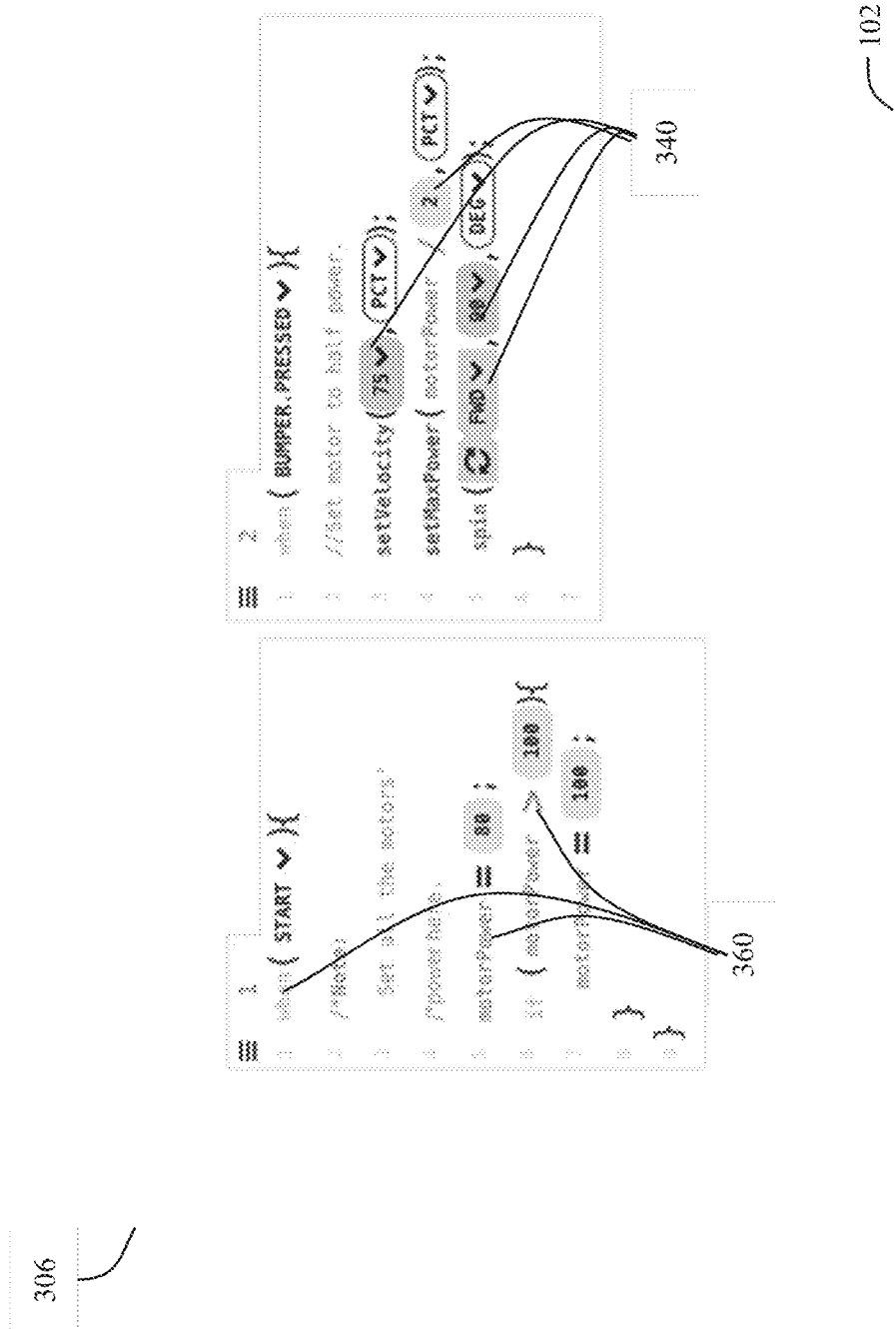

FIGS. 9E and 9F depict a notes view 306, 309 is a text view notes view 309 that retains the spatial freedom of traditional block programming languages, in accordance with an example embodiment of the present invention. While traditional text is confined to a vertical layout, notes in notes view can be arranged like sticky-notes on a wall: vertically, horizontally, and overlapping. Notes view makes moving from traditional blocks programming even easier where users can mainly type yet retain an important organizational paradigm from block programming.

FIG. 9C depicts a traditional text view which is a text editing view where code is edited vertically, in accordance with an example embodiment of the present invention. Syntactically and semantically directed and constrained draggability and droppability is optional and may be omitted for educational use where educators or learners wish to teach or learn to become more proficient at typing code directly. When using a slider or button to move between a traditional block view and a note view, the note view snippets are animated to and from their position in the traditional text view.

TABLE 1

|  | Natural Language Blocks | Programming Language Blocks | Frames | Notes | Traditional Text |
|---|---|---|---|---|---|
| description | A block view in the human language of the user. | A block view using the basic syntax of an underlying programming | A view in between block and text views where text is freely typed with unique | A text view that retains the spatial freedom of traditional block | A traditional text view. |

TABLE 1-continued

| | Natural Language Blocks | Programming Language Blocks | Frames | Notes | Traditional Text |
|---|---|---|---|---|---|
| | | language. | feedback and code snippets are also draggable. | programming languages. | |
| localizable/ translatable to other human languages | yes | no | no | no | no |
| draggable | yes | yes | yes | yes | optional |
| drag handles | everywhere except parameters | everywhere except parameters | left side of frame indicated by three vertical lines | notes are draggable by the top left. On hover drag handles (three vertical lines) can appear on left side of draggable text snippet | optional |
| shapes to depict syntax or semantics | yes | yes | yes | no | no |
| icons to depict type | yes | yes | yes | no | no |

Figure 14A:
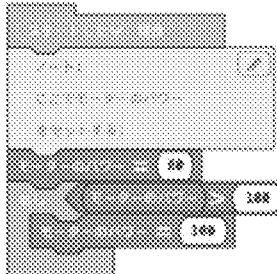

In accordance with example embodiments of the present invention, Table 1 and FIGS. 14A, 14B and 14C detail a plurality of code-editor workspace 102 views and their typical features. As a plurality of views for the same source code can be presented to the user, these views can be chosen by the user by pressing buttons associated with the views which in turn enable the features and styles in each view. Additionally individual features of each view can be controlled by a set of user settings so that a given view can be customized for the user removing or adding any styles or features desired. For instance this includes but is not limited to enabling a custom note view (FIG. 9E) that has all the features of a note view while adding shapes and icons to denote parameters. Those skilled in the art can appreciate that the present invention enables and encourages any view to take any feature or style from another view. Additionally in accordance with the present invention, a slider or rotary knob interface may be used to provide gradual changes between views. For instance FIG. 9E could be displayed when the user operates the slider to move between note and frame views or semicolons, commas, and parentheses may be displayed with programming block view styles or may be omitted when displayed with frame view styles while operating the slider between frame view and programming block view. The present invention can also produce animations using CSS animations between the different styles used in each display, whether using a slider, knob, or button to change views.

In accordance with an example embodiment, FIG. 15 shows how a given block can be displayed as a natural language block. Natural language blocks do not follow the syntax of a computer programming language but rather they follow the syntax of a given human (natural) language. While blocks, code and frames can be achieved simply by applying different styles to the same markup and setting a contenteditable attribute to true or false (e.g. blocks may have contenteditable attributes set to true for literal values where frames and text may have contenteditable set to true for all elements), natural language blocks generally require a translation between a given programming language and the natural language and a translation between a given API and the natural language. This translation can be done by humans and stored in a lookup table. For example the identifier "FWD" may be translated to "FORWARD" in English or "ADELANTE" in Spanish. To facilitate a smooth transition between natural language blocks and programming language blocks when a user chooses a different view mode with a user interface button or slider, the local language of the user may be loaded as special attributes during markup generation by the markup step consulting the lookup table (see the "data-natural-language-english" values in FIG. 15). Additionally computer languages may not support special symbols such as the degrees symbol but this may be preferred when translating to natural languages so a character code may be used as the localization (e.g. the HTML entity "°"). FIG. 15 also shows how CSS styles can be used with these special language attributes to replace the programming language words with those of the natural language. In this example, when an ancestor element's language attribute is set to "english" a small font size is used along with negative spacing and a transparent color to hide the content of the elements requiring localization. The "::before" pseudo element then shows the content stored in the "data-natural-language-english" attribute. In this example, both natural language and programming language blocks would share all block styles including block shape styles as well as a rule included in the example CSS to hide commas, semicolons, and parentheses. These hidden elements in addition to spaces can also be used to display additional words to intersperse between parameters or to change the order of natural language words and parameters (see "for" added between parameters in FIG. 15 by setting a special language attribute on a comma element and see translation of "when(BUMPER.PRESSED)" to Japanese in FIG. 9A where the language attribute for "when" would be and the actual translation for "when" would move to the language attribute of the close parenthesis) which allows for phrases using natural language syntax not available in many programming languages. There are many ways to store this data in a data structure 134 to enable the markup step to add these attributes, but one simple example that would work for this example is listed in FIG. 15. The markup generation step simply queries this data structure 134 for the user's local or set language and finds all the identifiers and function calls that need to be replaced. The markup can then be queried using XML query tools such as "querySelectorAll" to find "identifier" and "function-call" elements. The special language attribute may be added to identifiers directly, and once the function call elements are located, they may be queried for the comma elements and the appropriate comma (whichever index not set to null) can be set. This is just an example for illustration purposes and those skilled in the art can appreciate many ways to extend this for any translations needed including for the function call names themselves (for this example "spin" did not have to be translated)

Figure 9H:
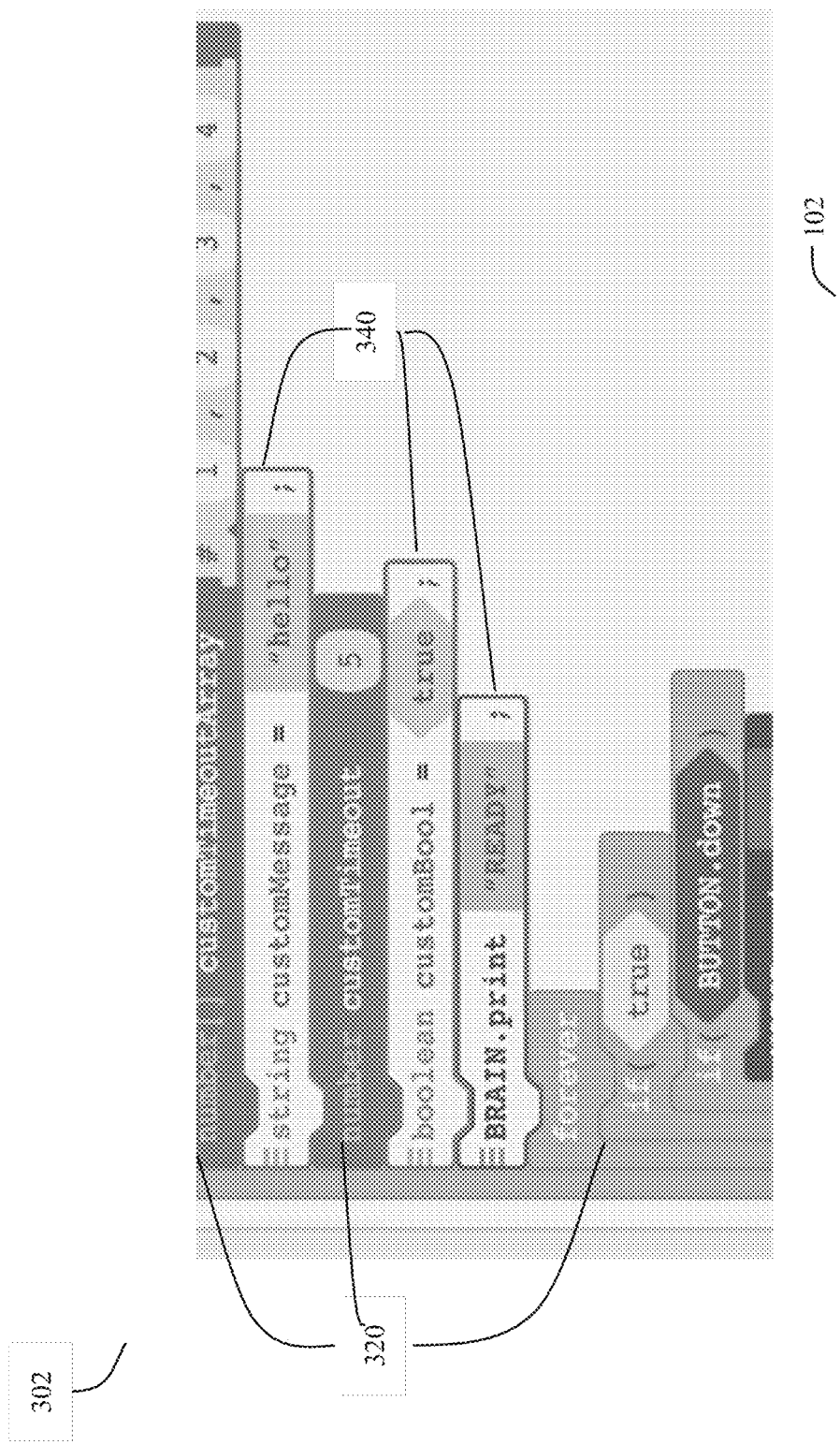
Figure 11B:
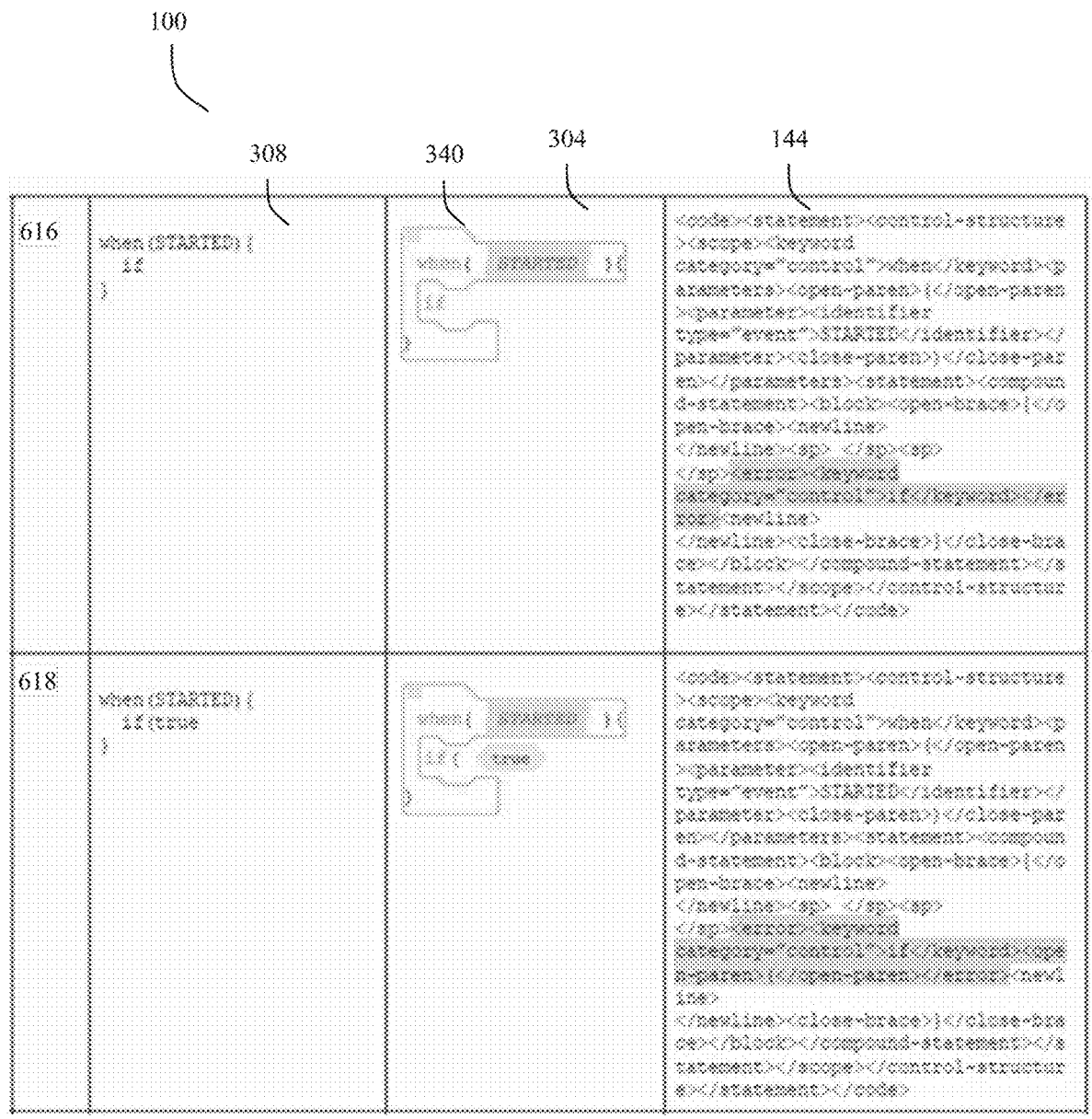
Figure 11C:
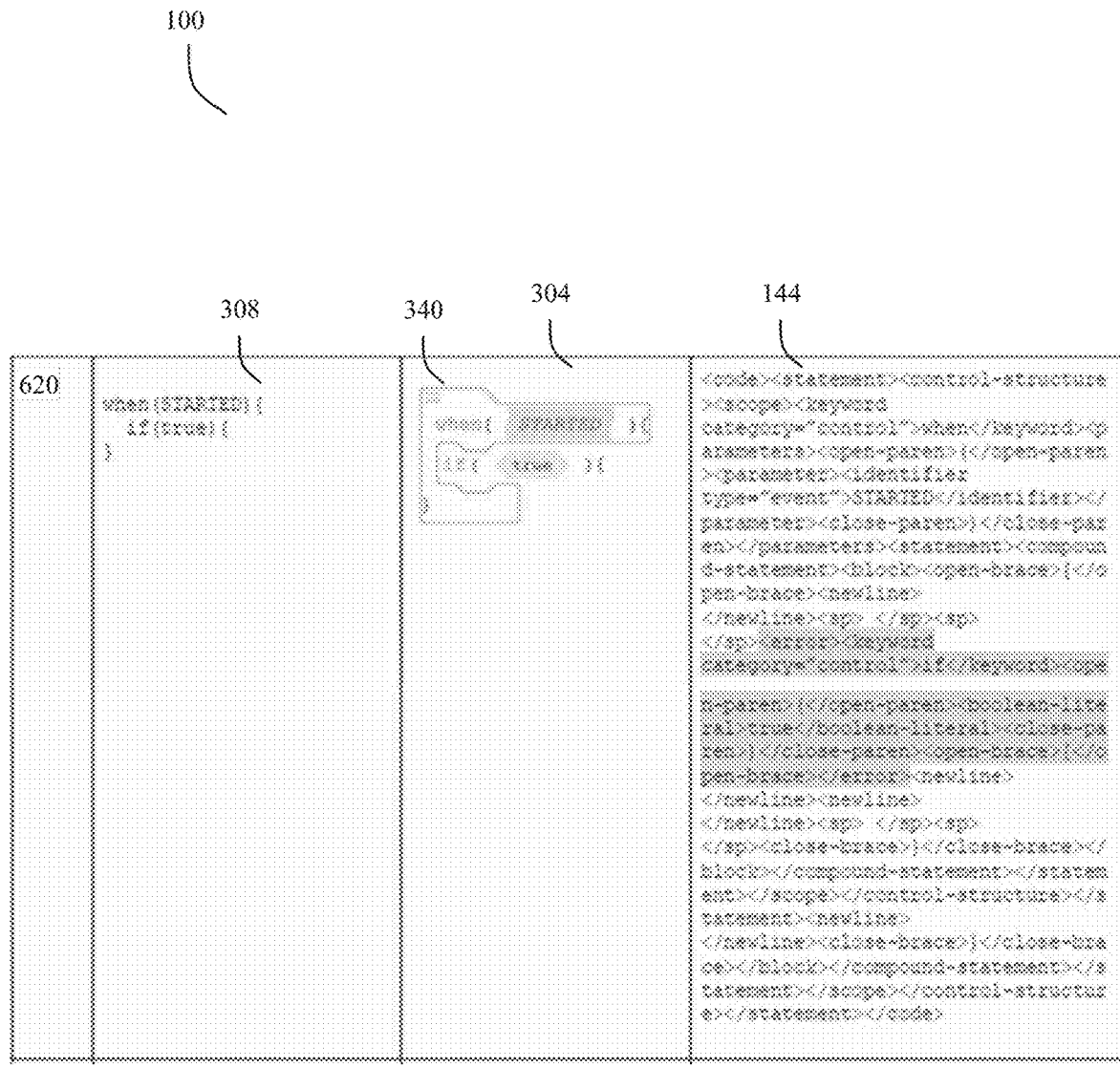
Figure 11D:
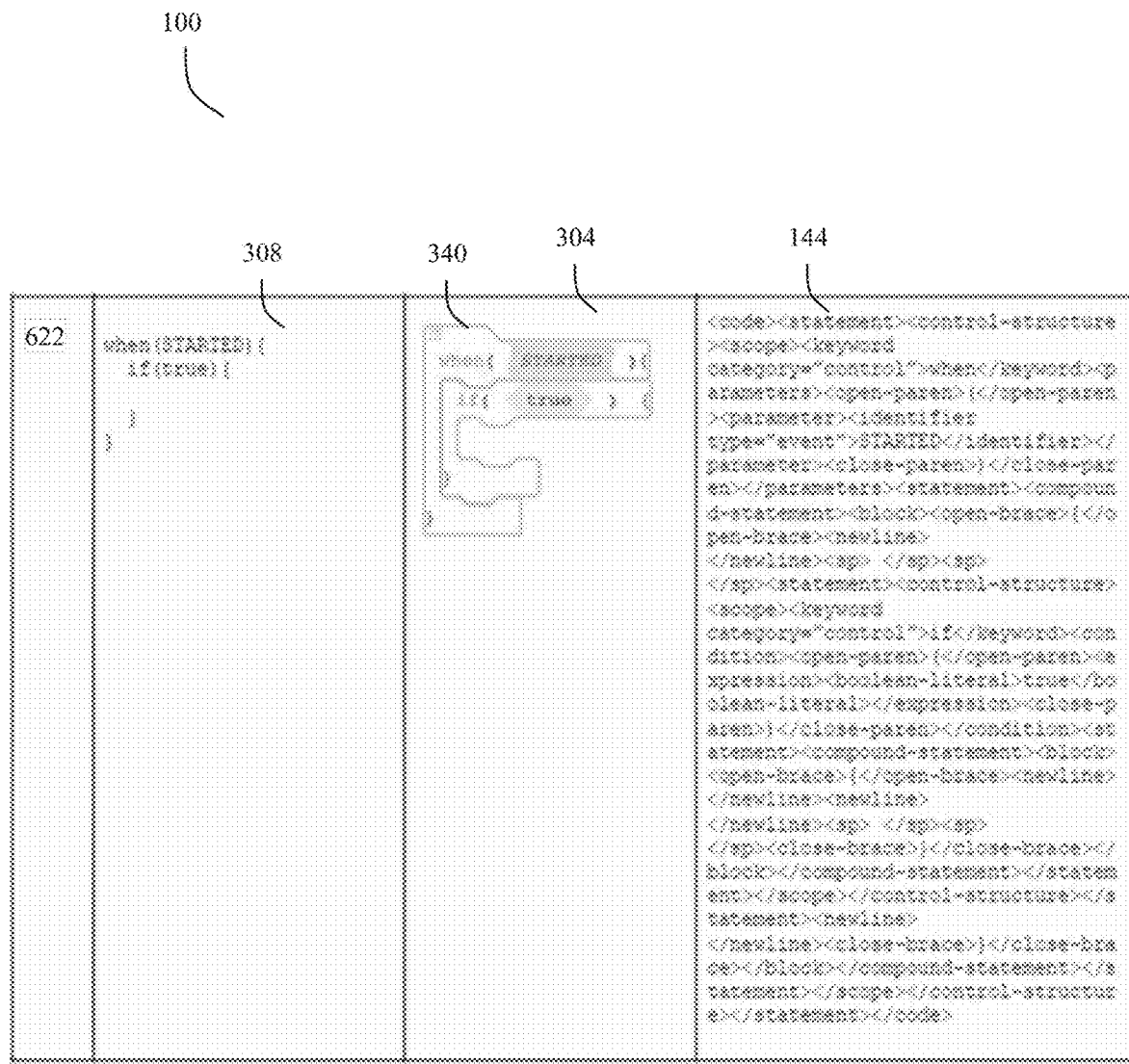
Figure 11E:
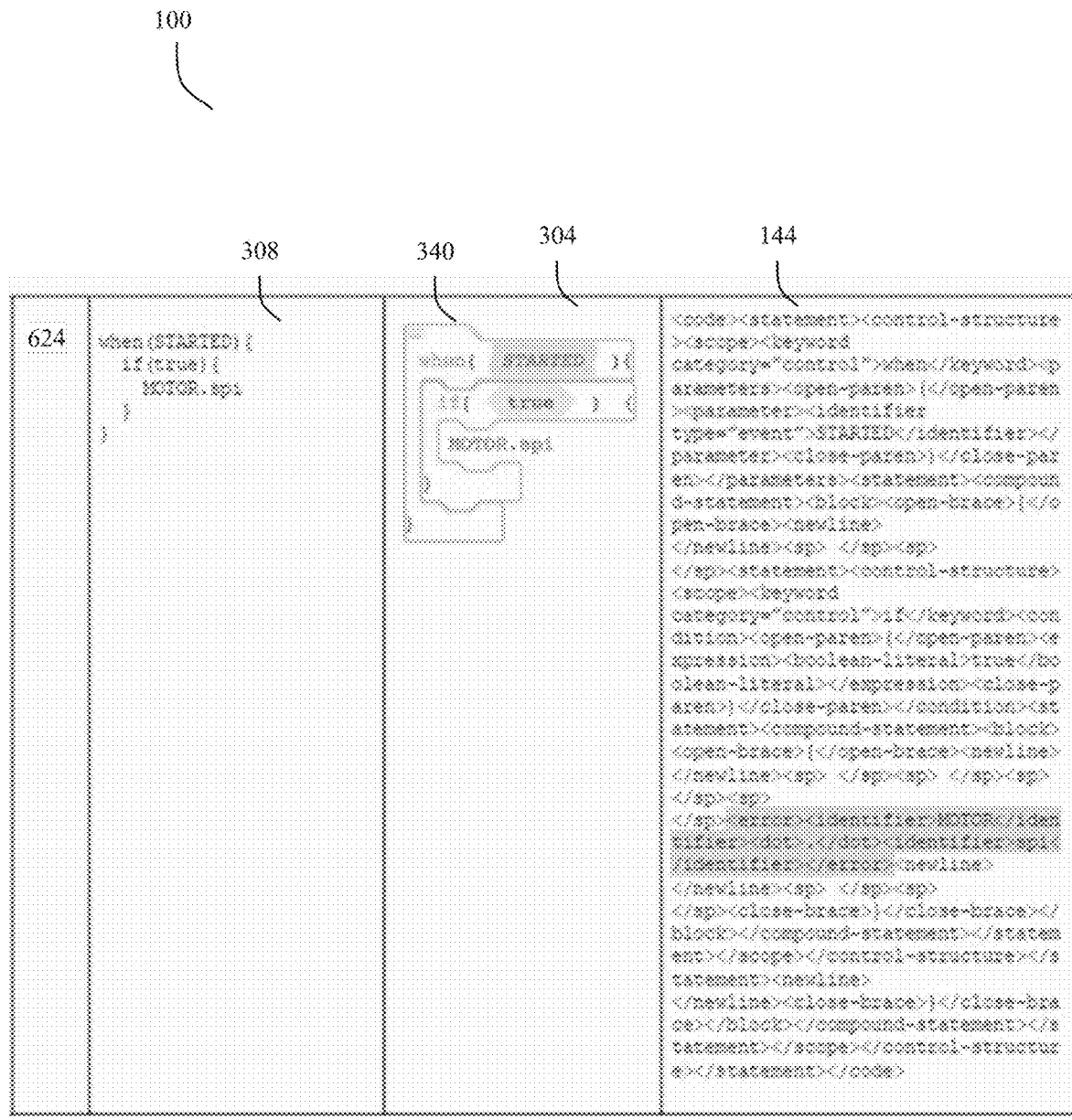
Figure 11F:
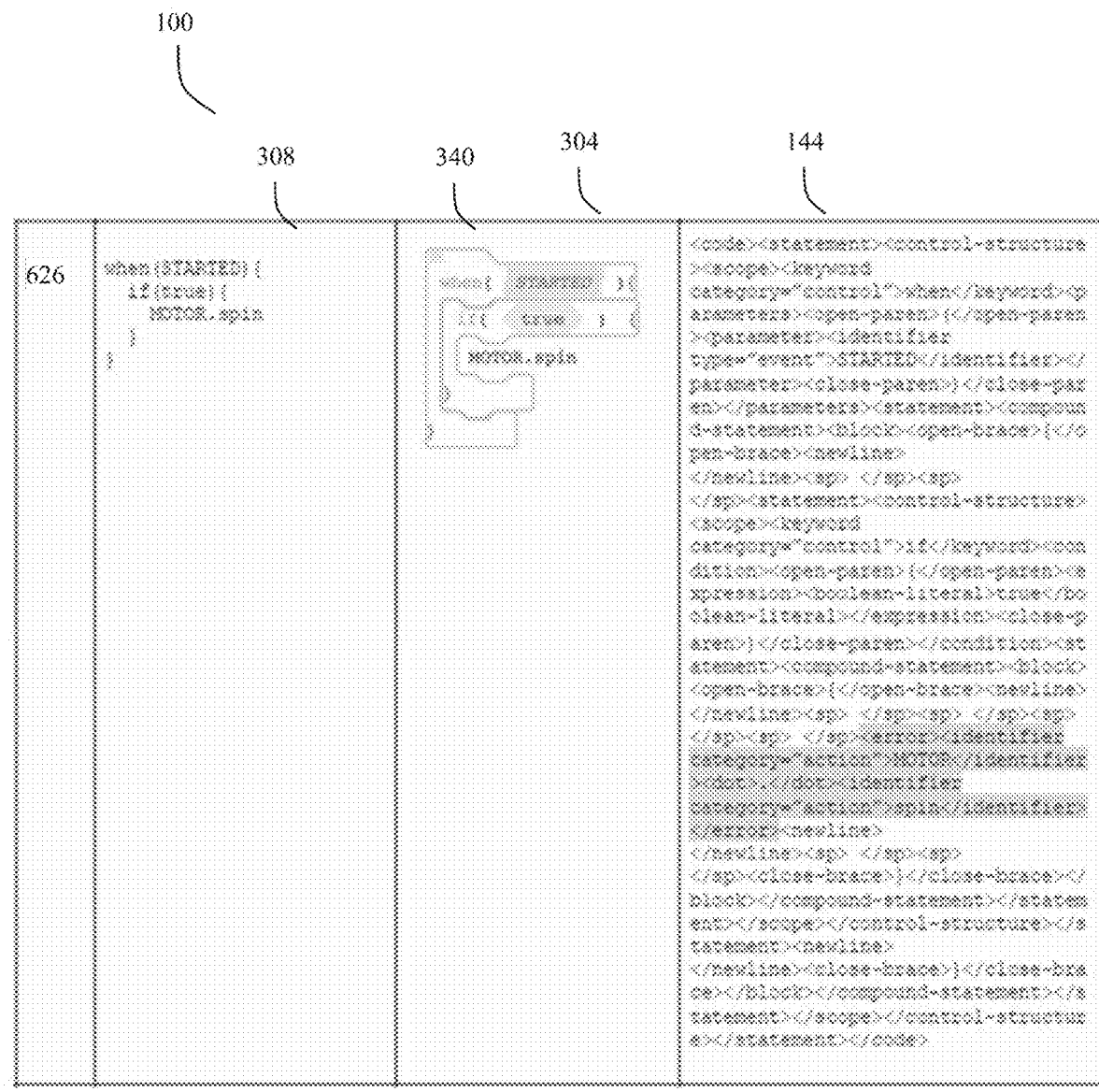
Figure 11G:
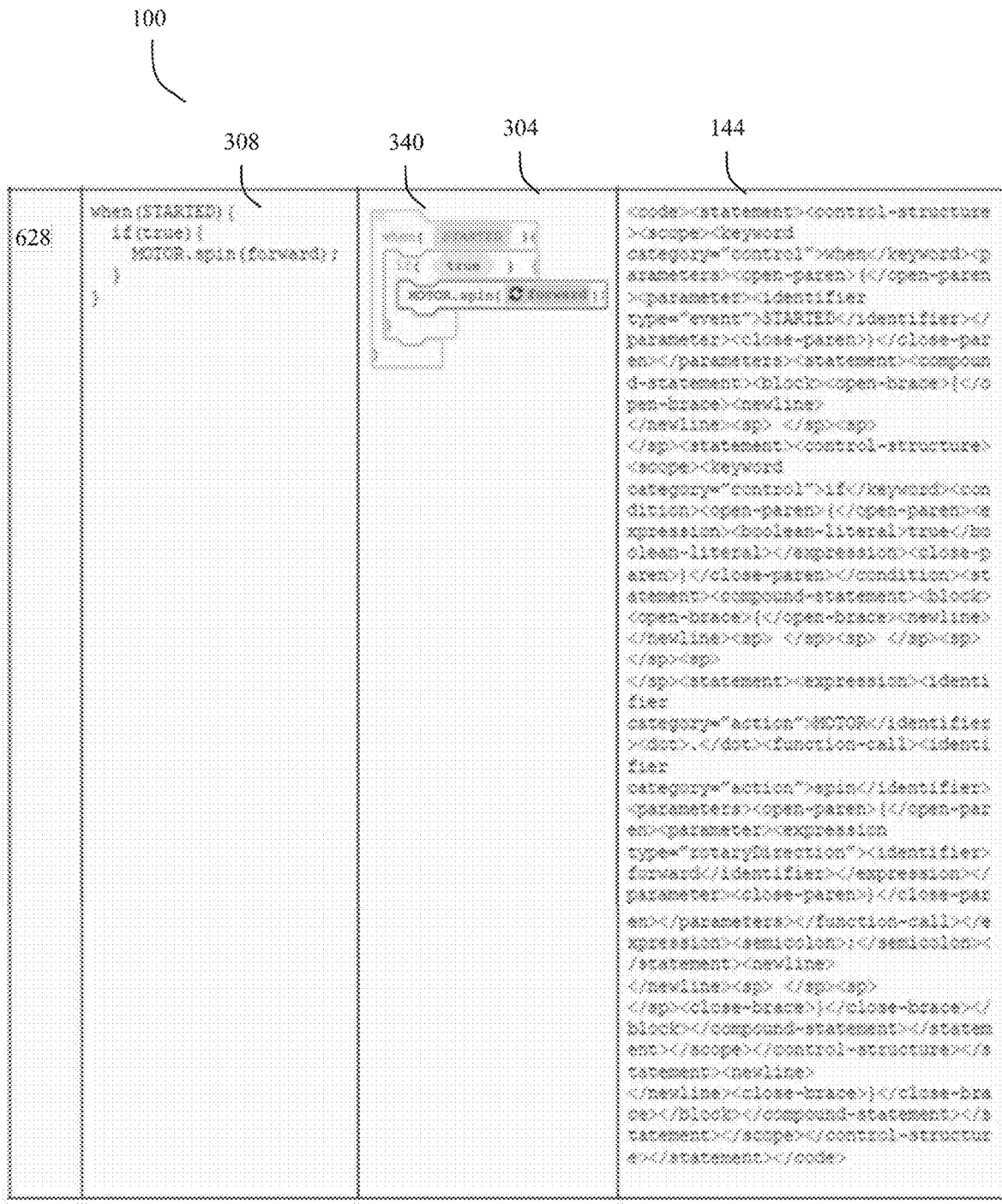

FIGS. 9A-9H depict example displays for some of the modes and views generated and displayed by the graphical user interface 111 and display 118, in accordance with an example embodiment of the present invention. In particular, FIG. 9A depicts an example illustration of a natural language block view localized in Japanese 301, FIG. 9B depicts an example illustration of a natural language block view localized in English 303, FIG. 9C depicts an example illustration of a traditional (programming language) block view 302, FIG. 9D depicts an example illustration of a frame view 304, FIG. 9E depicts an example illustration of an intermediate notes view 306, FIG. 9F depicts an example illustration of a note view 309, FIG. 9G depicts an example illustration of a traditional text view 308, and FIG. 9H depicts an example illustration of a mix between block view and frame view.

In accordance with an example embodiment of the present invention, a frame view 304 provides a programming interface with a framed display of program code, as depicted in FIG. 9D as the frame view 304. Frames 340 around portions of code (and their respective shapes) provide another visual way to show that parts of the code have been recognized by the grammar while the appearance (e.g., color) shows something about their semantics (meaning). Frames 340 can be represented as any combination of solid lines, dotted lines, shading, etc. When frames 340 are generated around a portion of code, the frames 340 themselves contain specific recognized syntactic elements such as simple statements, complex statements such as control structures (e.g., C and E shaped frames 340 such as if and if/else) and expressions (e.g., functions that return a value and can be placed in other expressions' or statements' parameter slots). In the frame view 304, unlike in the traditional blocks mode, all of the displayed text for the source code (within or outside of the frame code) is fully editable while still maintaining a framed display all the shapes users 162 are familiar with in blocks view. As would be appreciated by one of skill in the art, the frame view 304 can also include identifiable editable graphical elements similar to the identifiable editable graphical elements 322 of the blocks view despite all of displayed text in the frame view 304 being editable.

Additionally, the framed code provides unique functionality that is distinct from the functionality enabled in traditional blocks 320, in accordance with an example embodiment of the present invention. In particular, when typing new code, frames 340 and semantic highlighting 360 are added on the fly in real-time around the elements of source code as the system recognizes program elements such as keywords, literals, function calls, parameters, and statements (e.g., by the parser and analysis tool 116), as discussed in greater detail with respect to FIGS. 11A-11F. This is functionally is unique to frames 340 and the parsing backend provided by the present invention. Users 162 can begin to type text source code 128 while still benefiting from the same visual indicators of the program structure in terms of both syntax and semantics (e.g. type info as shape outlines, complex statements are grouped in C block outlines etc.).

Frames 340 provide clear indicators of semantics and syntax to both beginners and experts alike not provided by simple text highlighting. When typing code, outlines provide familiar and positive feedback when language elements like keywords, literals, identifiers, or statements are recognized rather than only having negative feedback when errors (e.g., syntax errors) are present. Similarly, when deleting portions of the source code, the outlines are removed when the changed source code 128 is no longer recognized as valid program elements or code structures 142. Additionally, the framed code can either be un-draggable or is draggable from one or more drag handles 341 (but not where the editable text is located as mouse presses activate the edit action not the drag action). By making frames 340 draggable, the user 162 loses none of the beneficial features provided by the block mode as the user 162 advances toward typing text code without the aid of blocks or frames 340.

In accordance with an example embodiment of the present invention, a hybrid view comprising an intermediate note view 306 featuring semantic highlighting provides a view with traditional text source code displayed with various highlighting and shape encapsulation of known source code elements. The semantic highlighting 360 can be provided utilizing any known semantic highlighting method or system known in the art. Examples of source code with different levels of semantic highlighting are depicted in FIGS. 9E and 9F. In accordance with an example embodiment of the present invention, the shapes and colorization of text and highlights are linked to shaped and colorizations used in other presentation views 126 (e.g., frame colors match block colors). These links of user interface elements 411 between presentation views 126 are linked by the types provided in the universal language code markup 132.

Additionally, in accordance with an example embodiment of the present invention, modes and views can include a traditional text view 308 known in the art. For example, the modes can include statically typed blocks such as statically typed programming language blocks, statically typed code safe blocks, statically typed code blocks, statically typed frames, statically typed frame blocks in a traditional block view, etc. As would be appreciated by one skilled in the art, any number of different code views known in the art can be provided by the present invention (e.g., via the graphical display generator 118).

In accordance with an example embodiment of the present invention, portions of a presentation mode or view can be modified to display and function like another mode or view. For example, when the graphical user interface 111 and display for a programming language block view 302 is displayed, one or more individual blocks 320 may be temporarily converted into a frame 340 display (and thus edited completely, even where editing was previously disabled or limited to dropdown options), as depicted in the block view 302 shown in FIG. 9H. By enabling partial mode changes for sections of source code 128, the graphical user interface 111 provides a user 162 all of the benefits of both modes (e.g., traditional block view 302 and frame view 304) while allowing users 162 the ability to focus on a single or set of blocks 320 or source code 128 when typing code. For example, portions of block mode temporarily changed to frames 340 allows the user 162 to fully edit the code within the frames 340, even where editing was previously disabled or limited to dropdown options as dictated by the functionality of the block view 302. As would be appreciated by one skilled in the art, the selection and switching of presentation mode for individual blocks 320 or blocks of code can be implemented using any combination of methods known in the art. Continuing the above example, the mode for a programming language block in block view 302 can be changed to a frame view 304 by right clicking an individual block 320 or a group of selected blocks and selecting a transformation to a frame view 304 from a menu. The transformed frame 340 portion can be converted back to traditional blocks 320 when the framed 340 code loses focus (user 162 clicks anywhere outside of framed 340 code).

FIGS. 10A-10I depict an example of how the display of the source code 128 changes in response to a user 162 typing input 140 into the code-editor workspace 102, in accordance with an example embodiment of the present invention. The presentation view 126 of operations depicted in FIGS. 10A-10I is the frame view 304 and the functionality provided therein is unique to the frame mode of operation. FIG. 10A depicts an initial section of valid source code 128 displayed in the frame view 304 including multiple frames 340 of source code 128. As a user 162 provides input 140, the hybrid programming environment system 100 monitors the input 140 via a parsing process (e.g., the parsing process of a parser and analysis tool 116 to determine whether the user 162 has begun entering a valid code structure based on known fully formed code structures 142. Throughout the monitoring and parsing process, a universal language code markup of the source code 128 is created and updated with the appropriate user interface elements, as discussed with respect to FIGS. 11A-11G.

When the hybrid programming environment system 100 determines that the snippets of parsed source code 128 are a valid code structure or a portion of what can be a valid code structure, the code-editor workspace 102 will provide semantic and syntax highlighting, as depicted in the example process in FIGS. 10A-10I. In particular, at FIG. 10B the code-editor workspace 102 or parser generator and analysis tool 116 parses the input 140 of "wai" and determines that there is not a valid code structure or portion of a potential valid code structure at that point in time. Therefore, as of FIG. 10B, the code-editor workspace 102 does not perform any framing, colorization, or highlighting of the input 140. At FIG. 10C the code-editor workspace 102 parses the input 140 "wait" and determines that this snippet can be identified as part of what could become a valid code structure. In response to this determination the code-editor workspace 102 performs the appropriate framing, colorization, and/or highlighting as dictated by the specific rules provided in the storage system 114. In this particular example, the characters of the string "wait" are modified to a display color (e.g., yellow) based on the control category (e.g., a statement) once user 162 completed typing the string. As would be appreciated by one skilled in the art, any default color (e.g., black text) and formatting of the code is otherwise visualized.

As the user 162 continues typing source code, the hybrid programming environment system 100 will continue monitoring the input 140 and resulting snippets entered by the user 162. FIGS. 10D-10F depict the periodic typing and parsing performed within the code-editor workspace 102. Throughout FIGS. 10D-10F the "wait" remains color coded and no other changes to the view of the source code are modified until the complete statement of "wait(1);" is input 140 by the user 162. At that point in time the code-editor workspace 102 identifies the completion of a valid statement and forms a frame around the snippet for "wait(1);" in the appropriate color and formatting for that type of code structure and presentation view 126. In this case, a rectangular frame is formed in the same display color as the snippet "wait". FIGS. 10D-10F illustrates how the hybrid programming environment system 100 provides positive feedback when the valid statement is recognized (e.g., by framing in the valid statement). Because the code-editor workspace 102 is able to parse and identify completed valid statements and snippets that may belong to valid statements prior to those statements being completed, the hybrid programming environment system 100 is able to provide insightful syntax and semantic feedback to a user 162. For example, a user 162 can start typing a statement (e.g., an "if" statement) including another element, such as a Boolean block, and receive positive feedback (e.g., text colorization) for a valid Boolean block before the statement which includes the Boolean block is completed itself. FIGS. 10G-10I illustrates how a Boolean block framing is drawn on the fly before the "if" statement, including the Boolean block, has been completely written by the user 162. Starting with FIG. 10G, the code-editor workspace 102 recognizes the start of an "if" statement and modifies the text color of "if" in the appropriate color (e.g., yellow) and thereafter the hybrid programming environment system 100 and code-editor workspace 102 recognize the start of the Boolean "BUTTON" and modifies the text color of the string "BUTTON" in the appropriate color (e.g., blue). FIG. 10F depicts the recognition and visualization by the hybrid code-editor workspace 102 of a completed valid code structure in the appropriate shape and color (e.g., blue rectangle). At this point in time, the "if" statement is still not a complete structure but remains colorization as a recognized start to a valid statement. FIG. 10I depicts the completion of a valid "if" statement and the code-editor workspace 102 recognizes the valid statement and frames the "if" statement including the compound Boolean. Those skilled in the art can also appreciate that frame view can be combined with traditional autocompletion allowing users to automatically complete code while receiving semantic and syntactic feedback indicating how the completed code will look.

The parser and analysis tool 116 maps grammar elements from the parse tree to tags 144 to create a language agnostic structure, as depicted in FIGS. 11A-11G. The mapping of grammar elements can include assigning tags 144 to each of the parsed code snippets. Tags 144 include but are not limited to statement, control-structure, keyword, parameters, parameter, scope, variable-declaration, etc. FIGS. 11A-11D depict a chart including four columns representing raw code that is entered by a user 162 at a given point in time, what is displayed (in the frame mode) to the user 162 as a result of the entered code, and a backend syntax markup and semantic attributes resulting from parsing performed by the hybrid programming environment system 100 (e.g., the parser generator and analysis tool 116). In the example provided in FIGS. 11A-11D the code-editor workspace 102 is operating in frame view 304 and the displays conveyed to the user 162 are the traditional text view 308 and the frame view 304. As would be appreciated by one skilled in the art, the user 162 can type in code in either the traditional text view 308 (e.g., represented by the second column) of the frame view 304 (e.g., represented by the third column) and the code will updated in both presentation views 126. The data provided in the chart of FIGS. 11A-11D is not intended to limit the present invention to the views and/or modes provided, the programming language provided, or the statements, functions, etc. included therein and is for illustrative purposes only. As would be appreciated by one skilled in the art, any combination of views, modes, programming languages, shapes, displays, etc. can be utilized with the present invention without departing from the scope of the present invention.

While a custom text version of a block language is the preferred embodiment of a hybrid editor to allow users to move back and forth between blocks and text, the present invention can be adapted for any programming language. In order to add a language to the editor, the present invention only needs to implement or adapt a markup generator for the desired language. While this simplifies the process of adding languages and decouples the language specific code from editor logic, it is possible to simplify adding languages even further. The present invention uses a parser and analysis tool 116, such as ANTLR, to build a language agnostic listener or parse tree walker that looks for labels, mapping any code with a given label to the corresponding tag and wrapping the code in the given tag. Tag names can be prepended with a prefix to ensure that labels may be used for another purpose in the grammar and characters useful in tags 144 that would be illegal as labels in a given parser and analysis tool 116 such as "-" can be swapped with another character such as "_" (see FIG. 13). This system 100 of the present invention enables the quick adaptation of existing grammars for popular parser and analysis tools 116 for use as markup generators. While existing grammars may need to be tweaked to accommodate the markup requirements to support a wide range of editor functionality, the present inventive system 100 enables a substantially faster and more efficient mechanism for adding support for multiple languages.

FIG. 12 depicts illustrative examples of the wide variety of ways source code may be framed in a frame view including solid lines, dotted lines, outlines, partially enclosed shapes, fully enclosed shapes. FIG. 12 also illustrates that any colors may be used for framing.

FIG. 13 depicts example grammar with labels to map grammar rules and elements to tags 144—when parser and analysis tool 116 matches these grammar rules it would add a <control-structure> tag.

While there are numerous ways to add the language agnostic metadata to source code 128, there are many benefits to using XML to do so, especially when the editor is loaded in a web browser or in an app that embeds a browser for its user interface. In this case, the XML returned from the markup generator can be displayed directly in the web browser, simply by appending it to an HTML page and applying any desired styles or event handlers to the specific XML tags 144. By applying the content-editable attribute, the styled and marked-up XML can also be edited directly as a DOM element. When changes are made to the element's text content, its raw text code can be retrieved by calling the textContent function on the DOM element and sent to the markup generator for updated markup.

There are various editor features that can be implemented utilizing the system 100 and method discussed herein. Some examples include indentation cleanup, auto-indentation, syntax highlighting, and semantic highlighting. Indentation cleanup requires at least the <block>, <statement>, <space>, <tab>, and <newline> tags 144. The editor can simply search for statements and then find their desired indentation level by counting the number of enclosing <block> tags 144. The current indentation level of the statement can then be calculated by counting the number of <tab> tags 144 and/or <space> tags 144 between the <statement> and any preceding <newline> tags 144. If the current indentation level is incorrect based on the current indentation setting, tags 144 can be inserted or removed between the <statement> and the preceding <newline>. Auto-indentation requires at least the <block>, <statement>, <space>, <tab>, and <newline> tags 144. When the enter key is pressed and the editor calculates the desired indentation level based on where the cursor is similar to the calculation for the cleanup and adds the required <space> and/or <tab> tags 144 after inserting a <newline> tag 144. Syntax Highlighting: useful with <block>, <statement>, <identifier>, <expression>, <keyword>, <operator>, <number-literal>, <string-literal>, <boolean-literal> etc. One of the main benefits of the system 100 and the decision to load the XML right in a web browser is how simple it then becomes to implement syntax highlighting. As the markup generator can utilize language grammars to analyze and markup source code 128, tags 144 can easily be created that map to universal grammar constructs like identifiers, operators, or blocks. CSS styles can then be created to style certain language elements in specific ways. For instance all keywords can be styled in red with the CSS: keyword{color:red;} and all operators can be colored green with operator{color:green;}.

Semantic highlighting requires at least the <identifier>, <scope>, and <variable-declaration> tags 144. The present invention is well suited to provide an efficient mechanism for providing semantic highlighting in a substantially language agnostic way that is unlike other semantic highlighters that require language specific implementation of many helper functions. Minor variations to this method can be made to accommodate languages with different scoping rules, however a general purpose semantic highlighter can be built as follows: Ensure that all source code 128 including library functions has been parsed by the markup generator (library functions can be pre-parsed as long as their symbols are cached or otherwise available to this method). Query the DOM element for each identifier in the source code 128 and determine if it is a local variable or not by querying for any variable-declarations at the same level and then finding its identifier's text content. Thereafter different colors can be assigned to each variable at each scope level by adding a variable number data attribute to each identifier and adding a local data attribute if the variable is defined locally and then styles can apply different colors in each case. Any semantic information can be gleaned and highlighted in this way making the present invention a powerful tool for semantic highlighting.

In accordance with an example embodiment of the present invention, an intermediate note view 306 featuring semantic highlighting provides a view with traditional text source code displayed with various highlighting and shape encapsulation of known source code elements. The semantic highlighting 360 can be provided utilizing any known semantic highlighting method or system known in the art. In accordance with an example embodiment of the present invention, the colorization of text and highlights are linked to colorizations used in block view.

Figure 16:
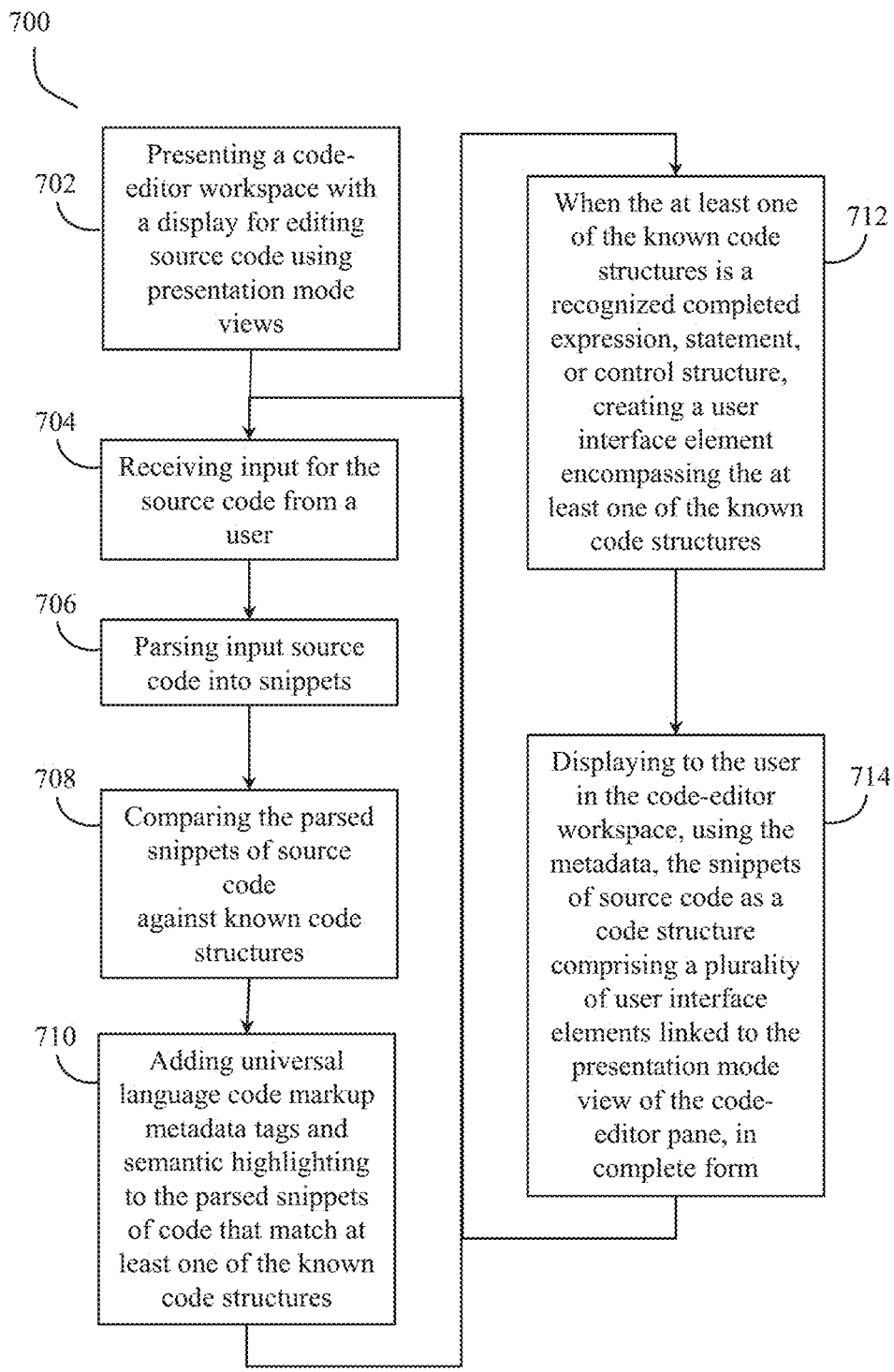
FIG. 16 is an illustrative flowchart depicting a method for parsing source code and creating a markup of the parsed code in accordance with the present invention.

FIG. 16 depicts a method 700 for writing, displaying, and editing source code 128. At step 702 the code-editor workspace 102 receives input 140 for source code from a user input device. For example, a user 162 types code into a user interface 110 such as the interface provided in FIG. 2C. At step 704 the code-editor workspace 102 (e.g., parser and analysis tool 116) parses snippets of code from an aggregate string of the keystrokes. In particular, the code-editor workspace 102 parses all of the aggregate of keystrokes up to that point in time. At step 706 the parsed aggregate string is compared against known code structures 142 (e.g., stored in the storage system 114).

Figure 17:
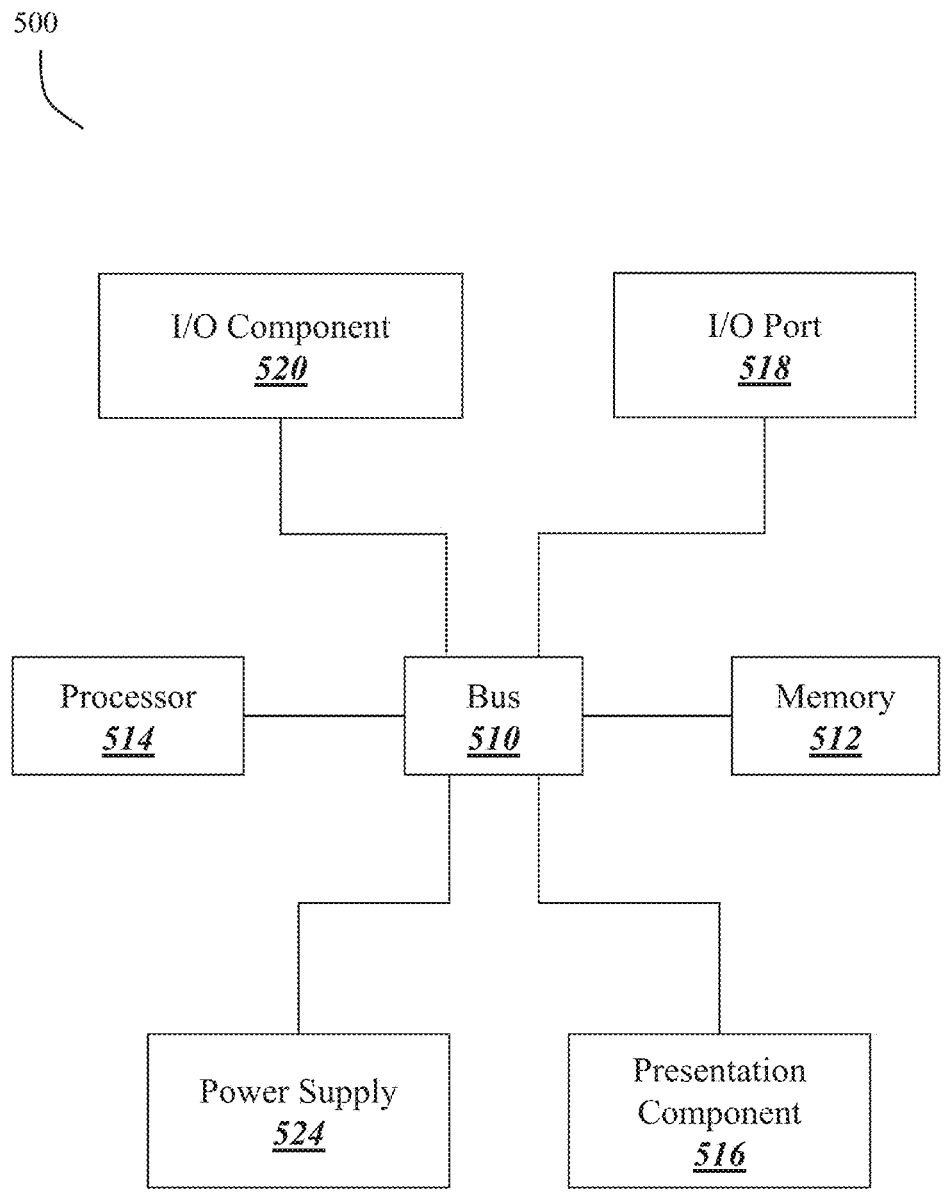
FIG. 17 is a diagrammatic illustration of a high level architecture for implementing processes in accordance with aspects of the invention.

Any suitable computing device 500 can be used to implement the computing/user 162 devices 104, or the hybrid programming environment system 100 and the code-editor workspace 102, and methods/functionality described herein and be converted to a specific system 100 for performing the operations and features described herein through modification of hardware, software, and firmware, in a manner significantly more than mere execution of software on a generic computing device 500, as would be appreciated by those of skill in the art. One illustrative example of such a computing device 500 is depicted in FIG. 17. The computing device 500 is merely an illustrative example of a suitable computing environment and in no way limits the scope of the present invention. A "computing device," as represented by FIG. 17, can include a "workstation," a "server," a "laptop," a "desktop," a "hand-held device," a "mobile device," a "tablet computer," or other computing devices 500, as would be understood by those of skill in the art. Given that the computing device 500 is depicted for illustrative purposes, embodiments of the present invention may utilize any number of computing devices 500 in any number of different ways to implement a single embodiment of the present invention. Accordingly, embodiments of the present invention are not limited to a single computing device 500, as would be appreciated by one with skill in the art, nor are they limited to a single type of implementation or configuration of the example computing device 500.

The computing device 500 can include a bus 510 that can be coupled to one or more of the following illustrative components, directly or indirectly: a memory 512, one or more processors 514, one or more presentation components 516, input/output ports 518, input/output components 520, and a power supply 524. One of skill in the art will appreciate that the bus 510 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 17 is merely illustrative of an exemplary computing device 104, 122, 500 that can be used to implement one or more embodiments of the present invention, and in no way limits the invention.

The computing device 500 can include or interact with a variety of computer-readable media. For example, computer-readable media can include Random Access Memory 108 (RAM); Read Only Memory 108 (ROM); Electronically Erasable Programmable Read Only Memory 108 (EEPROM); flash memory 108 or other memory 108 technologies; CDROM, digital versatile disks (DVD) or other optical or holographic media; magnetic cassettes, magnetic tape, magnetic disk storage (aka, storage system 114) or other magnetic storage devices that can be used to encode information and can be accessed by the computing device 500.

The memory 512 can include computer-storage media in the form of volatile and/or nonvolatile memory 108. The memory 512 may be removable, non-removable, or any combination thereof. Exemplary hardware devices are devices such as hard drives, solid-state memory 108, optical-disc drives, and the like. The computing device 500 can include one or more processors 106 that read data from components such as the memory 512, the various I/O components 516, etc. Presentation component(s) 516 present data indications to a user 162 or other device. Exemplary presentation components include a display device, speaker, printing component, vibrating component, etc.

The I/O ports 518 can enable the computing device 500 to be logically coupled to other devices, such as I/O components 520. Some of the I/O components 520 can be built into the computing device 500. Examples of such I/O components 520 include a microphone, joystick, recording device, game pad, satellite dish, scanner, printer, wireless device, networking device, and the like.

As utilized herein the phrases "syntactic element" and "semantic attribute" are meant to be understood generally in the broadest sense and are not to be confused or limited by the fact that an example embodiment is described that marks up identified syntactic elements of source code using XML elements or that it stores metadata identifying semantic attributes of syntactic elements using XML attributes of the XML elements identifying the syntactic elements.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A method for creating, editing, and viewing source code, comprising:

presenting to a user, using a processor of a computing device and a graphical user interface, a code-editor workspace comprising a display configured for selecting source code snippets and authoring, editing, and viewing source code;

receiving from the user a selected source code snippet;

providing, based on input from the user, user interface elements comprising a textual representation of the selected source code snippet as draggable using visual feedback, and providing feedback indicating where the textual representation will go;

parsing the source code already present, with a parser, and identifying drop zones corresponding to syntactic elements including one or more of the group consisting of parameters, conditions, whitespace and combinations thereof;

restricting, by the code-editor workspace and the graphical user interface, the textual representation of the selected source code snippet from being inserted where the selected source code snippet is incompatible with one or more of the group consisting of syntax, semantics and combinations thereof of source code already present, and allowing the selected source code snippet only to be dropped where metadata indicates the selected source code snippet will fit into the source code already present; and integrating the textual representation with text of source code already present, thereby enabling combined text code, comprising both the source code already present and the textual representation of the selected source code snippet, to be editable and capable of deletion in response to input from the user by an input-output interface communicating with the processor of the computing device, thereby generating a hybrid view in the code-editor workspace using the graphical user interface that combines a traditional text view comprising a human-readable text display of the source code edited by keystrokes typed by the user with selected source code snippet placement by dragging and dropping of user interface elements, that is restricted by one or more of the group consisting of syntax, semantics and combinations thereof, in a single view.

2. The method of claim 1, further comprising generating feedback indicating the graphical user interface allows placement by dragging and dropping of the selected source code snippet comprising one or more of the group consisting of feedback based on metadata for cursor proximity, additional user interface elements, and drag handles indicating where the selected code snippet is allowed to be dragged from.

3. The method of claim 1, wherein the feedback indicating where the textual representation will go further comprises pushing other text of source code already present out of position corresponding to a drop zone in the graphical user interface.

4. The method of claim 1, further comprising parsing, using a parser, the source code already present and the textual representation of the selected source code snippet and identifying from parsing new snippets, wherein new snippets match syntactic elements comprising one or more of the group consisting of statements, expressions, and combinations thereof, and wherein new snippets may be selected for dragging and dropping to move or remove said new snippets with respect to the graphical user interface and the code-editor workspace.

5. The method of claim 1, wherein positive feedback is presented indicating that upon dropping, the selected source code snippet is proper and inserted in a correct position as indicated by the metadata.

6. The method of claim 1, further comprising generating, based on a selected source code snippet, user interface elements comprising a textual representation of the selected source code snippet with visual feedback indicating the graphical user interface allows placement by dragging and dropping of user interface elements.

7. The method of claim 1, wherein metadata used to indicate whether the selected source code snippet will fit into the source code already present comprises metadata for syntactic elements, semantic attributes, and combinations thereof, wherein syntactic elements comprise one or more of the group consisting of statements, expressions, identifiers, keywords, compound statements, control structures, literal values, function calls, and combinations thereof, and wherein semantic attributes comprise one or more of the group consisting of expected data-types of parameters, return types of function calls, types of literal values, types of identifiers, types of variables, and combinations thereof.

8. A method for creating, editing, and viewing source code, comprising:

presenting to a user, using a processor of a computing device and a graphical user interface, a code-editor workspace comprising a display configured for authoring, editing, and viewing source code;

receiving keystrokes from the user by an input-output interface communicating with the processor of the computing device, and based on one or more received keystrokes, creating source code within the code-editor workspace or editing text of source code already present;

parsing, using a parser, source code within the code-editor workspace, identifying drop zones corresponding to syntactic elements including one or more of the group consisting of parameters, conditions, whitespace and combinations thereof, and identifying one or more of the group consisting of syntactic elements, semantic attributes, and combinations thereof, and generating visual feedback, indicating identification of one or more of the group consisting of particular identified syntactic elements, particular identified semantic attributes, and combinations thereof, comprising framing of one or more of the group consisting of the particular identified syntactic elements, the particular identified semantic attributes, and combinations thereof, using one or more of the group consisting of lines, outlines, partially enclosed shapes, fully enclosed shapes, an enclosed perimeter around the particular identified syntactic elements, and combinations thereof; and integrating text code, comprising both the source code already present and the edits based on the one or more received keystrokes, thereby enabling combined text code to be editable and capable of deletion in response to input from the user by an input-output interface communicating with the processor of the computing device, thereby generating a hybrid view in the code-editor workspace using the graphical user interface that combines a traditional text view, comprising a human-readable text display of the source code edited by one or more received keystrokes typed by the user, with visual feedback comprising framing of one or more of the group consisting of the particular identified syntactic elements, the particular identified semantic attributes, and combination thereof using one or more of the group consisting of lines, outlines, partially enclosed shapes, fully enclosed shapes, an enclosed perimeter around the particular identified syntactic elements, and combinations thereof, in a single view.

9. The method of claim 8, wherein syntactic elements comprise one or more of the group consisting of statements, expressions, identifiers, keywords, compound statements, control structures, literal values, function calls, and combinations thereof, and wherein semantic attributes comprise one or more of the group consisting of expected data-types of parameters, return types of function calls, types of literal values, types of identifiers, types of variables, and combinations thereof.

10. The method of claim 9, further comprising generating feedback indicating the graphical user interface allows placement by dragging and dropping of a selected source code snippet comprising one or more of the group consisting of feedback based on metadata for cursor proximity, additional user interface elements, and drag handles indicating where the selected code snippet is allowed to be dragged from.

11. A system for creating, editing, and viewing source code, comprising:
 a processor and memory;
 an input-output interface configured for receiving, from a user, an input of source code into a code-editor workspace and selection of code snippets within the code-editor workspace;
 a parser configured for parsing text content of the input of source code, identifying syntactic elements within the text content, and identifying drop zones corresponding to syntactic elements including one or more of the group consisting of parameters, conditions, whitespace and combinations thereof;
 the code-editor workspace presenting a graphical user interface to a user, using the processor, comprising a display on a computing device configured for authoring, editing and selecting source code, wherein the code-editor workspace comprises a frame view, comprising visually distinguishable user interface elements, wherein, upon identification of syntactic elements within the text content, the frame view presents to the user, in the graphical user interface, feedback comprising framing of identified syntactic elements using one or more of the group consisting of lines, outlines, partially enclosed shapes, fully enclosed shapes, an enclosed perimeter around the identified syntactic elements, and combinations thereof.

12. The system of claim 11, wherein the identified syntactic elements comprise one or more of the group consisting of statements, expressions, identifiers, keywords, compound statements, control structures, literal values, function calls, and combination thereof.

13. The system of claim 12, wherein the identified syntactic elements comprise an expression, and the code-editor workspace, using the graphical user interface, identifies a data-type associated with the expression and presents the user with additional feedback denoting the data-type of the expression.

14. The system of claim 13, wherein the additional feedback comprises one or more of the group consisting of a data-type specific shape, an icon, and combinations thereof.

15. The system of claim 11, wherein the user interface elements comprise visual cues and feedback comprising:
 indicating the graphical user interface allows placement by dragging and dropping of the user interface elements and providing, based on input from the user, the user interface elements as draggable;
 providing feedback indicating where the textual representation will go but restricting, by the code-editor workspace and the graphical user interface, the user interface elements from being dropped where the user interface elements are incompatible with one or more of the group consisting of syntax, semantics and combinations thereof of source code already present, and allowing the user interface elements only to be dropped where metadata indicates the user interface elements will fit into the source code already present, wherein positive feedback is presented indicating that upon dropping the user interface elements are proper and inserted in a correct position as indicated by the metadata; and
 wherein the user interface elements are integrated with text of source code already present, thereby generating a hybrid view in the code-editor workspace using the graphical user interface that combines the frame view comprising a human-readable text display of the source code edited by keystrokes typed by the user with user interface elements placement by dragging and dropping of user interface elements, that is restricted by one or more of the group consisting of syntax, semantics and combinations thereof, in a single view.

16. A system for creating, editing, and viewing source code, comprising:
 a processor and memory;
 an input-output interface configured for receiving, from a user, an input of source code into a code-editor workspace;
 a parser configured for parsing text content of the input of source code and identifying syntactic elements within the text content, and identifying drop zones corresponding to syntactic elements including one or more of the group consisting of parameters, conditions, whitespace and combinations thereof;
 the code-editor workspace presenting a graphical user interface to the user, using the processor, comprising a display on a computing device configured for authoring and editing source code, wherein the code-editor workspace comprises one or more presentation views comprising:
 a frame view, comprising visually distinguishable user interface elements, wherein, upon identification of syntactic elements within the text content, the frame view presents to the user, in the graphical user interface, feedback comprising framing of identified syntactic elements using one or more of the group consisting of lines, outlines, partially enclosed shapes, fully enclosed shapes, an enclosed perimeter around the identified syntactic elements, and combinations thereof.

17. The system of claim 16, wherein the identified syntactic elements comprise one or more of the group consisting of statements, expressions, keywords, compound statements, control structures, literal values, function calls, and combination thereof.

18. The system of claim 17, wherein the identified syntactic elements comprise an expression, and the code-editor workspace, using the graphical user interface, identifies a data-type associated with the expression and presents the user with additional feedback denoting the data-type of the expression.

19. The system of claim 18, wherein the additional feedback comprises one or more of the group consisting of a data-type specific shape, an icon, and combinations thereof.

20. The system of claim 16, wherein the user interface elements comprise visual feedback comprising:
indicating the graphical user interface allows placement by dragging and dropping of the user interface elements and providing, based on input from the user, the user interface elements as draggable;
providing feedback indicating where the textual representation will go but restricting, by the code-editor workspace and the graphical user interface, the user interface elements from being dropped where the user interface elements are incompatible with one or more of the group consisting of syntax, semantics and combinations thereof of source code already present, and allowing the user interface elements only to be dropped where metadata indicates the user interface elements will fit into the source code already present, wherein positive feedback is presented indicating that upon dropping the user interface elements are proper and inserted in a correct position as indicated by the metadata; and
wherein the user interface elements are integrated with text of source code already present, thereby generating a hybrid view in the code-editor workspace using the graphical user interface that combines the frame view comprising a human-readable text display of the source code edited by keystrokes typed by the user with user interface elements placement by dragging and dropping of user interface elements, that is restricted by one or more of the group consisting of syntax, semantics and combinations thereof, in a single view.

21. A system for creating, editing, and viewing source code, comprising:
a processor and memory;
an input-output interface configured for receiving, from a user, an input of source code into a code-editor workspace;
a parser configured for parsing text content of the input of source code and identifying syntactic elements within the text content, and identifying drop zones corresponding to syntactic elements including one or more of the group consisting of parameters, conditions, whitespace and combinations thereof;
the code-editor workspace presenting a graphical user interface to the user, using the processor, comprising a display on a computing device configured for authoring and editing source code, wherein the code-editor workspace comprises a plurality of presentation views for presenting the source code in the display using a plurality of user interface elements based on metadata and markup of the source code, wherein each presentation view of the plurality of presentation mode views provides different graphical displays of the source code based on markup of the source code and a unique set of rules controlling functionality of displayed user interface elements, the plurality of presentation mode views comprising two or more of the group consisting of:
a natural language block view wherein program code is presented to the user in a natural language;
a programming language block view comprising program code presented to the user in a traditional programming language and where language elements including the group consisting of identifiers, commas, parentheses, semicolons, periods, and combinations thereof may be hidden or replaced;
a frame view, comprising visually distinguishable user interface elements, wherein, upon identification of syntactic elements within the text content, the frame view presents to the user, in the graphical user interface, feedback comprising framing of identified syntactic elements using one or more of the group consisting of lines, outlines, partially enclosed shapes, fully enclosed shapes, an enclosed perimeter around the identified syntactic elements, and combinations thereof;
a note view comprising individual snippets of code wherein each note snippet can be dragged to any position on a graphical display and may overlap other notes or snippets; and
a traditional text view, in which text only source code comprising a human-readable programming language is edited by typing, and combinations thereof comprising a hybrid mode view as selected by the user.

22. The system of claim 21, further comprising a graphical user interface comprising a user interface element for switching between presentation views and providing animations between views highlighting differences between presentation views, wherein presentation views that transition with the animations include one or more of the group consisting of natural language block view, programming language block view, frame view, note view, traditional text view, and intermediary views comprising a subset of visual styles from combinations thereof.

23. A system for creating, editing, and viewing source code, comprising:
a processor and memory;
an input-output interface configured for receiving, from a user, an input of source code into a code-editor workspace and selection of code snippets within the code-editor workspace; and
a parser configured for parsing text content of source code and identifying drop zones, corresponding to syntactic elements including one or more of the group consisting of parameters, conditions, whitespace and combinations thereof;
wherein the code-editor workspace presenting a graphical user interface to a user, using the processor, comprising a display on a computing device configured for authoring, editing and selecting source code, wherein the code-editor workspace comprises a human-readable text display of the source code, wherein the source code is editable upon receiving one or more keystrokes typed by the user and selected code snippets are placeable within the source code by dragging and dropping, and wherein the dropping of selected code snippets is restricted by one or more of the group consisting of syntax, semantics and combinations thereof.

* * * * *